(12) United States Patent
Thomas et al.

(10) Patent No.: US 12,416,349 B2
(45) Date of Patent: Sep. 16, 2025

(54) VEHICLE TRANSMISSION AND METHOD OF OPERATION

(71) Applicant: Means Industries, Inc., Saginaw, MI (US)

(72) Inventors: Steven M. Thomas, Saginaw, MI (US); Joshua D. Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/745,969

(22) Filed: Jun. 17, 2024

(65) Prior Publication Data

US 2024/0337307 A1   Oct. 10, 2024

Related U.S. Application Data

(62) Division of application No. 17/940,217, filed on Sep. 8, 2022, now Pat. No. 12,013,017.

(60) Provisional application No. 63/249,279, filed on Sep. 28, 2021.

(51) Int. Cl.
*F16H 3/66* (2006.01)

(52) U.S. Cl.
CPC ...... *F16H 3/663* (2013.01); *F16H 2200/0034* (2013.01); *F16H 2200/2007* (2013.01); *F16H 2200/2023* (2013.01)

(58) Field of Classification Search
CPC ...... F16H 3/003; F16H 3/10; F16H 2003/007; F16H 2200/0034
See application file for complete search history.

(56) References Cited

U.S. PATENT DOCUMENTS

| | | | | |
|---|---|---|---|---|
| 4,222,473 A | * | 9/1980 | Kopich | F16D 41/16 192/43.1 |
| 8,418,585 B2 | * | 4/2013 | Yang | F16H 3/005 74/319 |

* cited by examiner

*Primary Examiner* — Huan Le
(74) *Attorney, Agent, or Firm* — Burgess Law Office, PLLC

(57) ABSTRACT

A vehicle transmission using a gearset. Multi-mode clutches selectively couple components of the gearset. The transmission operates in and shifts between a first forward gear and a second forward gear using a change in input rotation. An electric motor coupled to the input may be used to change the input rotation direction.

18 Claims, 19 Drawing Sheets

(__/__)
(CW/CCW) lock direction
1: Struts up; either lock or overrun
0: Strut covered; free in either direction
(1/1): Both strut sets up, lock in both CW or CCW rotation
(1/0): Lock CW rotation, or overrun with CCW rotation
(0/1): Lock CCW rotation, or overrun with CW rotation
(0/0): Both strut sets covered, free in both CW or CCW rotation

VEHICLE TRANSMISSION AND METHOD OF OPERATION

CROSS-REFERENCE TO RELATED APPLICATIONS

This application is a continuation of U.S. patent application Ser. No. 17/940,217 filed on Sep. 8, 2022. This application claims the benefit of U.S. Provisional Application No. 63/249,279, filed Sep. 28, 2021. The disclosures of the above applications are incorporated herein by reference.

BACKGROUND OF THE INVENTION

1. Field of the Invention

The invention generally relates to a vehicle power train or drive system; and, more specifically, a drive system using an electric motor.

2. Description of Related Art

Vehicle powertrains or drive systems typically incorporate multiple clutch elements. Existing powertrains are configured as concentric and parallel axis architectures, including electric motors.

In the field of automotive technology, motor vehicle drive trains using electric motors and planetary drive trains include controllable or selectable coupling assemblies, for example, one-way clutches. These coupling assemblies can be electromagnetically operated and magnetically controlled.

These one-way clutches often include first and second members and at least one locking element (e.g., a strut, a pawl, etc.). The locking element moves between a deployed position, wherein the locking element extends from the first member and engages the second member, and a non-deployed position, wherein the locking element does not extend from the first member. Thereby, the first and second members are disengaged from each other.

Examples of one-way clutches can be found in U.S. Pat. No. 5,927,455, a bi-directional overrunning pawl-type clutch; U.S. Pat. No. 6,244,965 a planar overrunning coupling; and U.S. Pat. No. 6,290,044, a selectable one-way clutch assembly for use in an automatic transmission. U.S. Pat. Nos. 7,258,214 and 7,344,010 disclose overrunning coupling assemblies and U.S. Pat. No. 7,484,605 discloses an overrunning radial coupling assembly or clutch. The disclosures of each are hereby incorporated by reference. The foregoing is not exclusive; other selective or one-way clutches may be used and are known. The foregoing are examples of one-way clutches that may be used in the vehicle drive system disclosed herein.

SUMMARY OF THE INVENTION

A vehicle drive system having an electric motor operable in a first direction and a second direction. The system includes a first shaft, a second shaft, a first gearset connecting the first shaft to the second shaft, the first gearset including an intermediate gear, and a second gearset connecting the first shaft to the second shaft. A coupling assembly that selectively couples the first shaft to the second shaft through one of the first gearset and the second gearset. Wherein operating the electric motor in the first direction and selectively coupling the first shaft to the second shaft through the first gearset operates the second shaft at a first forward speed and operating the electric motor in the second direction and selectively coupling the first shaft to the second shaft through the second gearset operates the second shaft at a second forward speed.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or its uses.

Figure 1:
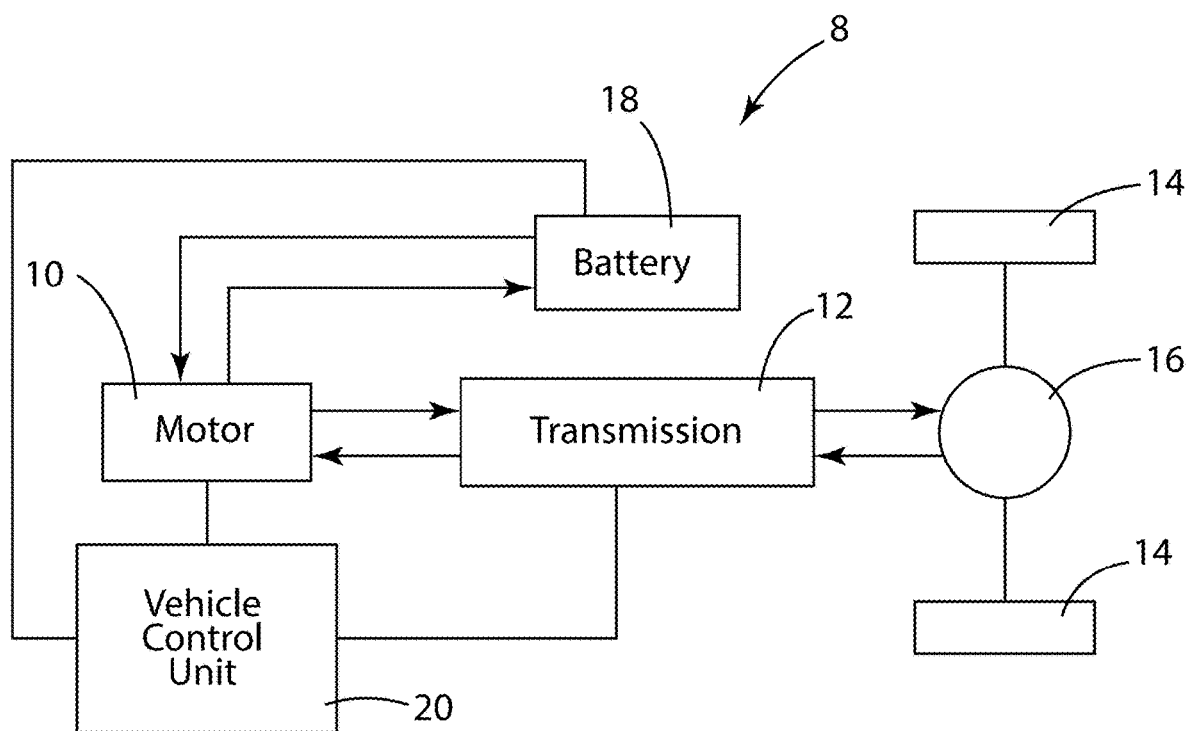
FIG. 1 is a schematic illustration of a vehicle drive system for a motor vehicle.

FIG. 1 is a schematic illustration of an electric vehicle drive system, generally indicated at 8. The vehicle drive system 8 includes an electric motor 10 with two rotary output directions. For example, the motor output shaft spins in two pre-determined directions: clockwise or counterclockwise.

A transmission 12 connects the electric motor 10 to the vehicle wheels 14 through a differential 16. The electric motor 10 operates as a motor in a power mode—receiving electrical power from the battery 18 and transforming it to mechanical power. The motor output of the electric motor 10 in the power mode provides the input to the transmission 12. The transmission 12 provides an output to the vehicle wheels 14. A vehicle control unit 20 interfaces with the electric motor 10, transmission 12, and battery 18 and controls the functional aspects of the electric powertrain.

In the power mode, the electric motor 10 motor receives electrical power from a battery 18 and transforms it to mechanical power. The mechanical power is the rotary input, clockwise or counterclockwise, to the transmission 12.

In a regeneration mode—the electric motor 10 operates as a generator—receiving mechanical power from the transmission 12 and transforming it to electrical power. When an electric vehicle operates in a regeneration mode, the electric motor 10 feeds current to the battery 18 while developing a counter torque that acts as a brake. Said another way, on deceleration, manual rotation of the vehicle wheels 14 turns the electric motor 10, essentially changing it into a generator, which creates electricity to charge the battery.

Figure 2:
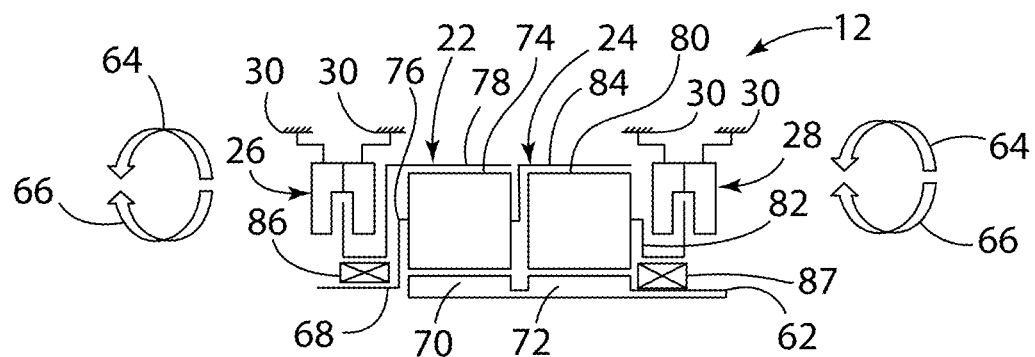
FIG. 2 is a schematic illustration of an example gearset of a multi-speed transmission for use with the vehicle drive system of FIG. 1.

FIG. 2 schematically illustrates one example of the transmission 12, as a 2-speed transmission including two simple planetary gearsets 22, 24, and two controllable mechanical diodes (CMD) 26, 28. As illustrated in FIG. 2, the controllable mechanical diodes 26, 28 located on each side of the planetary gearsets 22, 24 operate to selectively couple portions of the planetary gearsets 22, 24 to a transmission housing, generally indicated at 30.

Selectively coupling portions of the planetary gearsets 22, 24 to the transmission housing 30 controls the transmission 12 output. The vehicle control unit 20 directly controls the controllable mechanical diodes (CMD) 26, 28 wherein each controllable mechanical diode (CMD) 26, 28 changes between multiple modes in response to a control signal from the vehicle control unit 20.

A controllable mechanical diode (CMD) may include a selectable one-way clutch. A selectable one-way clutch is a clutch that allows the selection of different modes. In one example, at least one clutch mode must be a one-way clutch. The clutches can either be static (1 race of the clutch not able to rotate) or dynamic (both clutch races can rotate). The one-way clutch modes allow for a smooth shift due to the synchronization characteristics of one-way clutches. While CMDs are disclosed, other selectable clutches, for example, a dynamically controllable clutch (DCC), along with other actuator travel clutches may also be used.

Figure 3A:
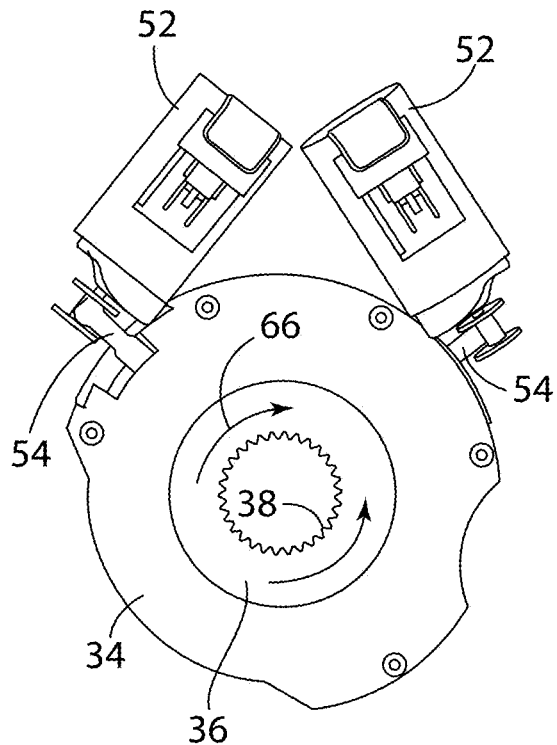
FIG. 3A is a side view of a controllable mechanical diode.
Figure 3B:
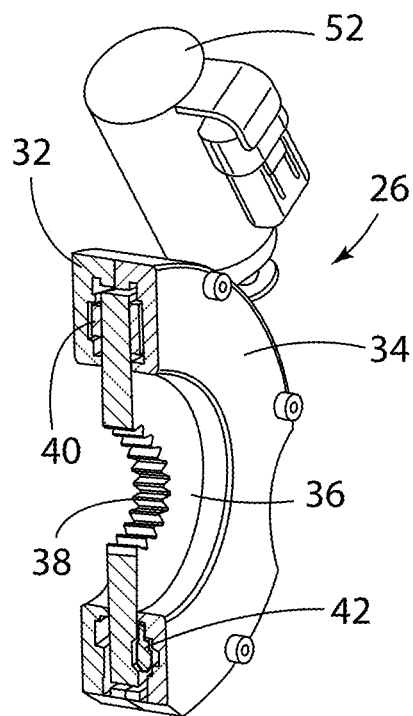
FIG. 3B is a cross-sectional perspective view of a controllable mechanical diode.

FIGS. 3a-3b schematically illustrate one example of the controllable mechanical diodes (CMD) 26, 28. Each controllable mechanical diode (CMD) is a pair of one-way clutches (OWC) 32, 34 located on opposite sides of an annular plate 36 having internal splines 38. One-way clutch 32 includes struts 40 operable to engage the annular plate 36 in one direction of rotation. One-way clutch 34 includes struts 42 operable to engage the annular plate 36 in the opposite direction of rotation.

Figures 4A, 4B, 5:
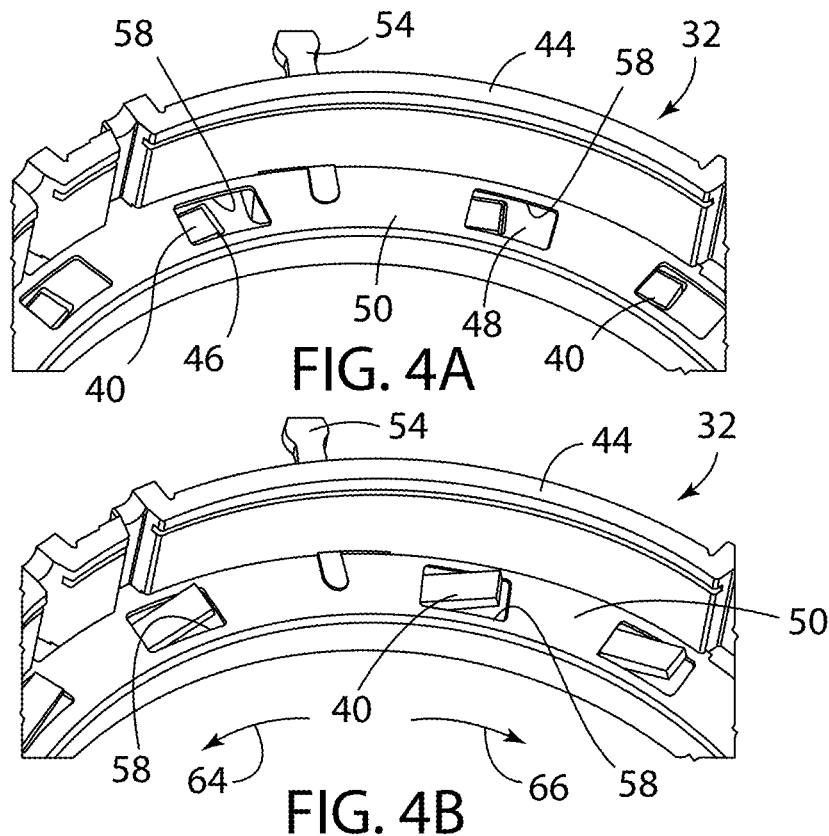
FIG. 4A is a partial view of a controllable mechanical diode showing the struts in their respective pockets.
FIG. 4B is a partial view of a controllable mechanical diode showing the struts extending from their respective pockets.
FIG. 5 is a table showing strut position associated with multiple controllable mechanical diode conditions.

FIGS. 4a-4b show the one-way clutch 32, including a plurality of outwardly pivotable struts 40 mounted in recesses or pockets 46 in a side surface 48 of a housing 44 of the one-way clutch 32. FIG. 4a shows a selector plate 50, located adjacent to the side surface 48 of the housing 44, that retains, or keeps, the struts 40 in the recesses or pockets 46 in the housing 44. An actuator 52, see FIGS. 3a-3b, coupled to the selector plate 50 by an arm 54, moves or rotates the selector plate 50 in a counterclockwise direction, arrow 64, to align the respective openings 58 in the selector plate 50 with the corresponding struts 40. When the openings 58 in the selector plate 50 and the corresponding struts 40 align, the struts 40 extend through and past the openings 58.

FIG. 4b shows one position of the selector plate 50 relative to the housing 44 of the one-way clutch 32. In this position, the struts 40 extend past the selector plate 50, engage, and prevent rotation of the annular plate 36 in the counterclockwise direction, arrow 64. To prevent rotation of the annular plate 36, the struts 40 engage openings or recesses (not shown) in the annular plate 36. With the selector plate 50 positioned as shown in FIG. 4b, the annular plate 36, located adjacent to the selector plate 50, can rotate in the clockwise direction, arrow 66. The annular plate 36 rotates in the clockwise direction, arrow 66, because the struts 42 pass over the recesses of the annular plate 36. In this manner, torque can be transferred in one direction, counterclockwise, but not in the opposite direction, clockwise.

The CMD functions such that when the driving member transfers torque to the driven member in one direction, the struts will become locked in the recesses of the driven coupling plate. The driven coupling plate overruns the driving coupling plate when torque transfer is interrupted. As used herein, the term overrun refers to a condition wherein the struts are up, able to engage, with the plate rotating in the not lock direction-similar to a bicycle traveling forward with pedals stationary; the term freewheel or free refers to a condition wherein the struts are down, not able to engage, with the plate 36 rotating in either direction-similar to a disengaged dog clutch; and the term lock refers to a condition wherein the struts are up and holding torque-similar to engaged dog clutch. In an overrun condition, the struts pass over the recesses of the driven plate, resulting in a planar coupling assembly adapted for torque transfer in one direction while permitting freewheeling relative motion in the opposite direction. The strut selector plate 50 is positioned to permit freewheeling motion.

As illustrated in FIGS. 3a and 3b, the CMD 26 includes two one-way clutches 32, 34 acting on each side of the annular plate 36. Each CMD 26, 28 is a four-mode CMD, the modes being 0/0, 0/1, 1/0, and 1/1. A four-mode CMD provides a lock in both directions 1/1, a lock in one direction 0/1 or 1/0, or a lock in neither direction 0/0. For example, the annular plate 36 can be locked on one side, both sides, or neither side. In the 0/0 mode, unlocked or free, both one-way clutches 32, 34 are freewheeling. The strut selector plates 50 cover the struts 40, 42 preventing engagement with the annular plate 36. In mode 1/1, the strut selector plates 50 uncover the struts 40, 42 allowing engagement of the struts with the annular plate 36 and locking the annular plate 36 by preventing rotation of the plate in both clockwise and counterclockwise directions relative to the respective housings of the one-way clutches 32, 34. Modes 0/1 and 1/0 uncover the struts of one one-way clutch 32, 34, allowing rotation in one direction only.

As used herein, the term "clutch" should be interpreted to include clutches or brakes wherein one of the plates is drivably connected to a torque delivery element of a transmission, and the other plate is drivably connected to another torque delivery element or is anchored and held stationary to a housing. The terms "coupling," "clutch," and "brake" may be used interchangeably.

The illustrated vehicle transmission 12 uses one-way clutches and an electric motor. The transmission 12 provides available features such as park-lock, hill-hold, and neutral. The transmission 12 includes a $1^{st}$ gear and a $2^{nd}$ gear. The terms $1^{st}$ and $2^{nd}$ gear(s) apply to forward gears having different gear ratios. The 2-speed electric vehicle transmission 12 has two forward speeds, the first associated with the $1^{st}$ gear and the second associated with the $2^{nd}$ gear.

The transmission 12 uses a 4-node planetary gearset 22, 24, an electric motor 10, and two 4-mode CMDs 26, 28 to shift between a $1^{st}$ forward gear and a $2^{nd}$ forward gear or from a $2^{nd}$ forward gear to a $1^{st}$ forward gear using a change in motor direction. For example, when the transmission 12 is in the $1^{st}$ forward gear, the electric motor 10 rotates counterclockwise for forward vehicle direction. When the transmission 12 is in the $2^{nd}$ forward gear, the electric motor 10 rotates clockwise for forward vehicle direction.

Using the CMDs 26, 28 allows for a quick shift by coming off and landing on the one-way clutch. The CMDs 26, 28 can lock in both directions for power-on and regen in both 1st and 2nd gears. The CMDs 26, 28 allow placing the transmission directly into park, neutral, or hill-hold in either $1^{st}$ or $2^{nd}$ gear without changing to $1^{st}$ gear. The CMDs 26, 28 enable reverse direction in both $1^{st}$ and $2^{nd}$ gear.

The 2-speed transmission 12, in connection with changing the rotational direction of the electric motor 10, provides a 2-speed electric vehicle. Changing the rotational direction of the electric motor 10 enables the vehicle to go forward and reverse in both $1^{st}$ and $2^{nd}$ gear.

The electric motor 10 rotates and provides power, to the input shaft 62, in both the counterclockwise and clockwise directions. Correspondingly, the input shaft 62 rotates in the counterclockwise and clockwise directions, arrows 64, 66. As disclosed herein, the direction of electric motor 10 rotation and selected mode of the CMDs 26, 28 results in different outputs at the output shaft 68.

As illustrated in FIG. 2, the input shaft 62 provides the input to both the first planetary gearset 22 and the second planetary gearset 24 through a first sun gear (S1) 70 and a second sun gear (S2) 72. The first planetary gearset 22 includes a plurality of first planetary gears, generally indicated at 74, a first planet carrier (PC1) 76, and a first ring or annulus gear (A1) 78. The second planetary gearset 24 includes a plurality of second planetary gears, generally indicated 80, a second planet carrier (PC2) 82, and a second ring or annulus gear (A2) 84. When the electric motor 10 provides power to the input shaft 62, in either direction shown by the arrows 64, 66, the respective first and second sun gears (S1, S2) 70, 72 rotate in the same direction. The output shaft 68 connects to and rotates with the first planet carrier (PC1) 76. The term "gearset" broadly refers to a gear mechanism for transmitting motion, and in one example includes a set of gears forming a group.

Figure 2A:
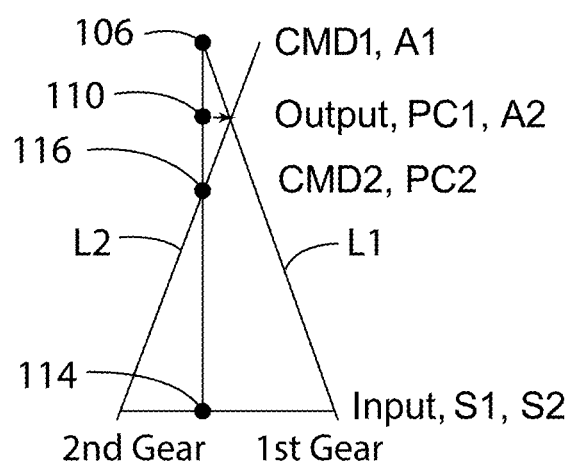
FIG. 2A is a lever diagram of the gearset shown in FIG. 2.

FIG. 2A is a lever diagram illustrating a first lever L1 associated with the $1^{st}$ gear and a second lever L2 associated with the $2^{nd}$ gear. Each lever has four nodes, the input S1 70 and S2 72, the first CMD 26 associated with A1 78, the second CMD 28 associated with PC2 82, and the output PC1 76, A2 84. Depending on the input S1, S2, and where the gearset is grounded, the first or second CMD, the lever diagram represents the output at PC1, A2.

Each CMD 26, 28 has multiple strut positions, for example, up or down/covered. FIG. 5 is a table showing strut position associated with multiple conditions. The nomenclature (/_) refers to rotation direction, clockwise and counterclockwise (CW/CCW, the first _ refers to the clockwise direction, and the second _ refers to the counterclockwise direction. As indicated, a 1 means: Struts up; either lock or overrun, and a 0 means: Strut down/covered; free in either direction. For example, (1/1): Both strut sets up, lock in both CW or CCW rotation; (1/0): Lock CW rotation, or overrun with CCW rotation; (0/1): Lock CCW rotation, or overrun with CW rotation; and (0/0): Both strut sets down/covered, free in both CW or CCW rotation.

In one example, the transmission 12 includes the first CMD 26 connected to the first ring or annulus (A1) 78. The connection can be splined, wherein the splines of the annular plate 36 engage complementary splines on the first ring or annulus (A1) 78. The housing 44 of the CMD 26 is fixed to the transmission housing 30 and remains stationary. The second CMD 28, like the first CMD 26, also has its housing 44 fixed to the transmission housing 30 and remains stationary. The annular plate 36 of the second CMD 28 is connected to the second planet carrier (PC2) 82. FIG. 2 shows a bearing 86 located between the output shaft 68/first planet carrier (PC1) 76 and the first ring or annulus (A1) 78 and a bearing 87 located between the input shaft 62 and the second planet carrier (PC2) 82. As illustrated, the first ring or annulus (A1) 78 rotates about the output shaft 68, and the second planet carrier (PC2) 82 rotates about the input shaft 62.

The output, rotation speed, and direction of the output shaft 68 can be controlled depending upon the selected mode of each CMD 26, 28, which controls the rotation of the first ring or annulus (A1) 78 and the second planet carrier (PC2) 82.

FIGS. 6-12 show one example of a transmission 12 including two simple planetary gearsets, 22, 24, and two CMDs 26, 28 with the power path, either $1^{st}$ or $2^{nd}$ gear of the transmission 12, controlled by rotation direction of the electric motor 10 and the selected mode of each CMD 26, 28.

Figure 6:
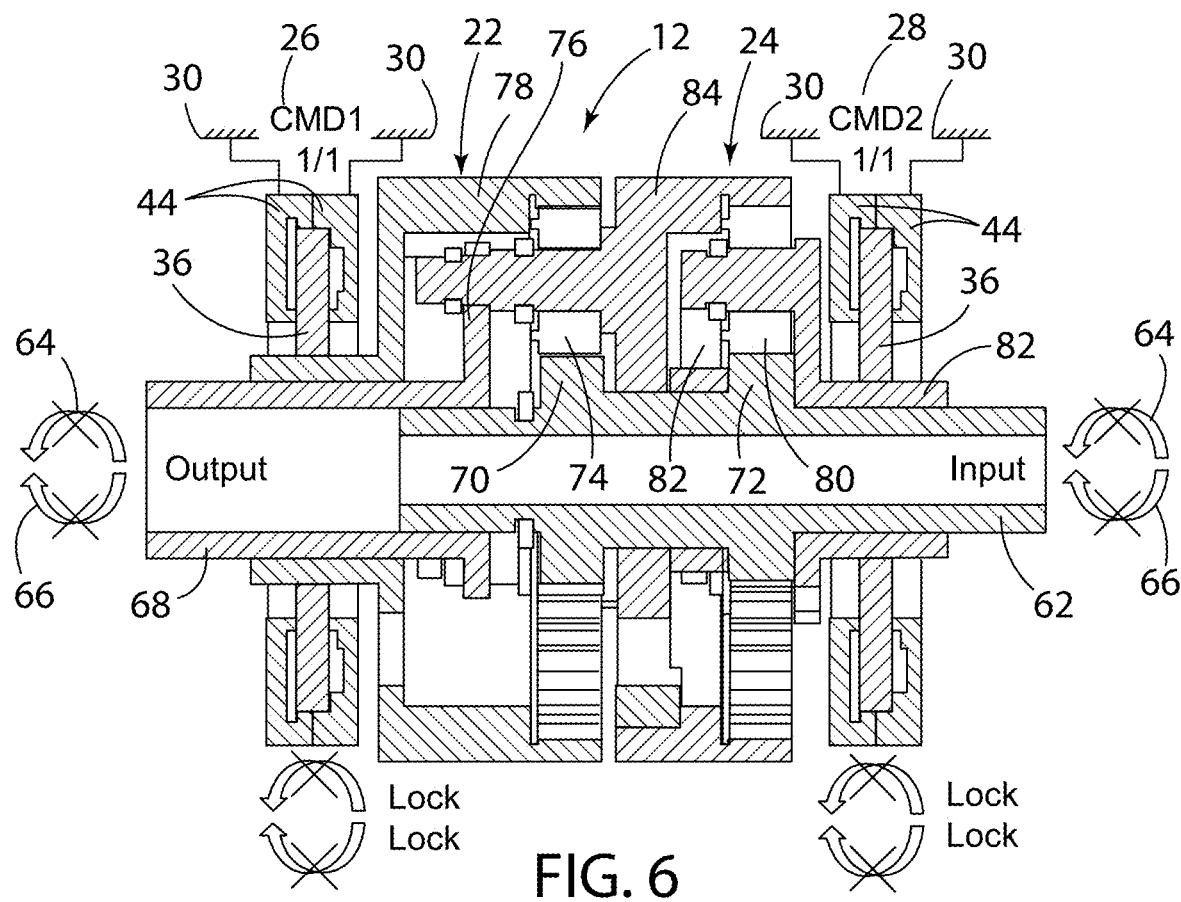
FIG. 6 is a schematic cross-sectional illustration of a 2-speed transmission in the park condition.
Figure 6A:
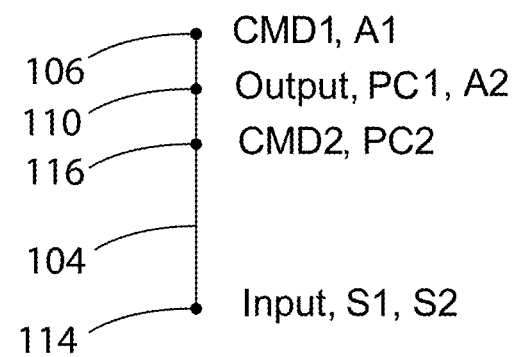
FIG. 6A is a lever diagram of the gearset of the transmission shown in FIG. 6.

FIG. 6 illustrates the transmission in the park condition. The transmission achieves this condition/position by placing both CMDs 26, 28 in a 1/1 mode or lock-lock position. The Xs over arrows 64, 66 indicate that both the input shaft 62 and output shaft 68 cannot rotate either counterclockwise or clockwise. Locking the first ring or annulus (A1) 78 and the second planet carrier (PC2) 82 prevents rotation of the remaining components of the first and second planetary gearsets 22, 24, thereby preventing any output or input to or from the wheels 14 of the vehicle. Lever diagram, FIG. 6A shows transmission 12 output at the output node 110 when the vehicle is in the park condition.

Figure 7:
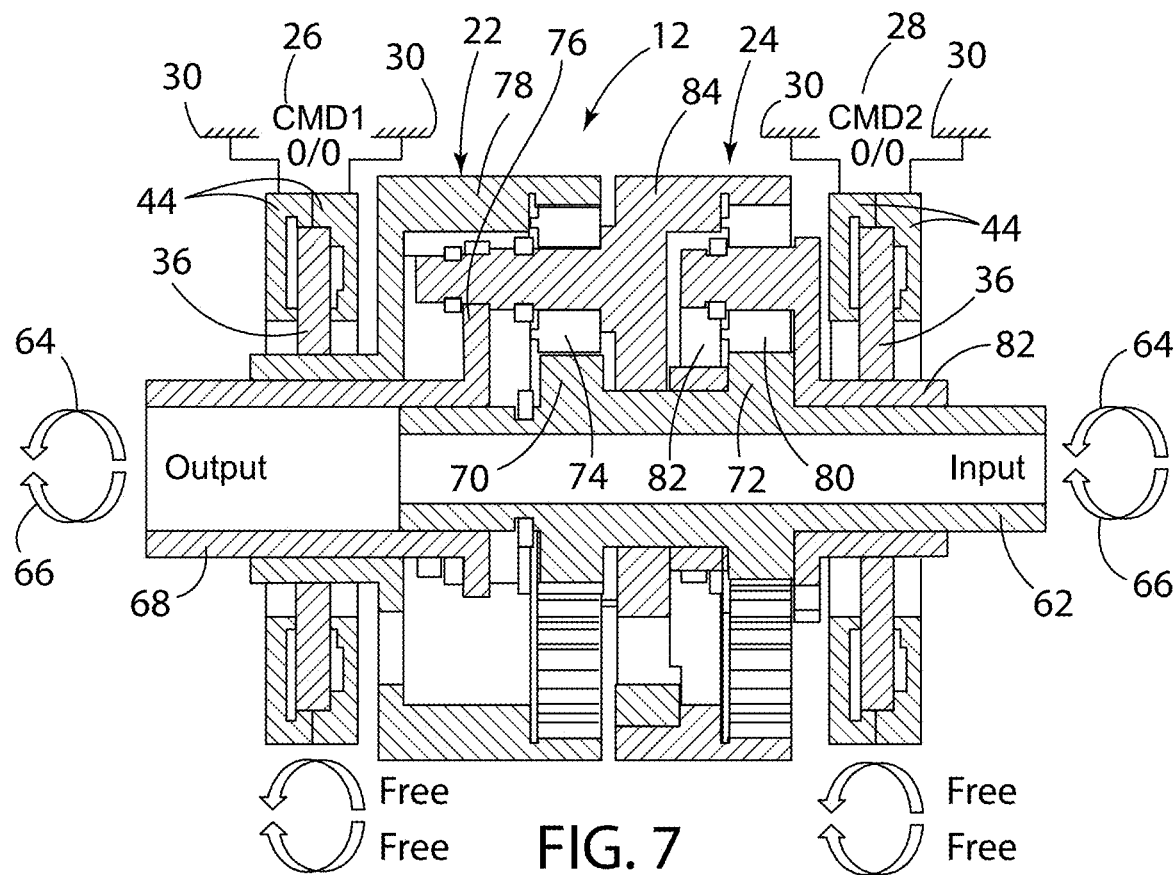
FIG. 7 is a schematic cross-sectional illustration of a 2-speed transmission in a neutral condition.
Figure 7A:
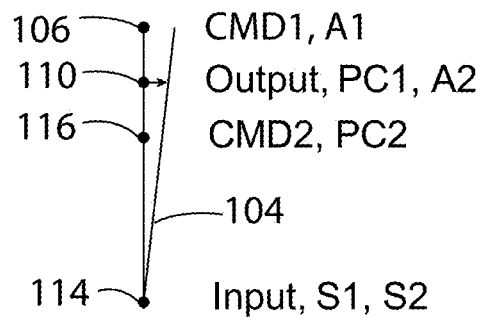
FIG. 7A is a lever diagram of the gearset of the transmission shown in FIG. 7.

FIG. 7 illustrates the transmission in a neutral condition. The transmission achieves this condition/position by placing both CMDs 26, 28 in a 0/0 mode or free-free position (unlock-unlock). Unlocking the first ring or annulus (A1) 78 and the second planet carrier (PC2) 82 provides free rotation of the remaining components of the first and second planetary gearsets 22, 24. Specifically, placing the first ring or annulus (A1) 78 in a free or unlocked position allows rotation of the first ring or annulus (A1) 78 as the first planet carrier (PC1) 76 rotates about the first sun (S1) 70. As the first planet carrier (PC1) 76 correspondingly rotates the second ring or annulus (A1) 84, the second planet carrier (PC 2), due to its free or unlocked state, rotates about the second sun 72 (S2) wherein no force, torque, or rotation is applied by or to the input shaft 62. Lever diagram, FIG. 7A shows transmission 12 output at the output node 110 when the vehicle is in the neutral condition.

Figure 8:
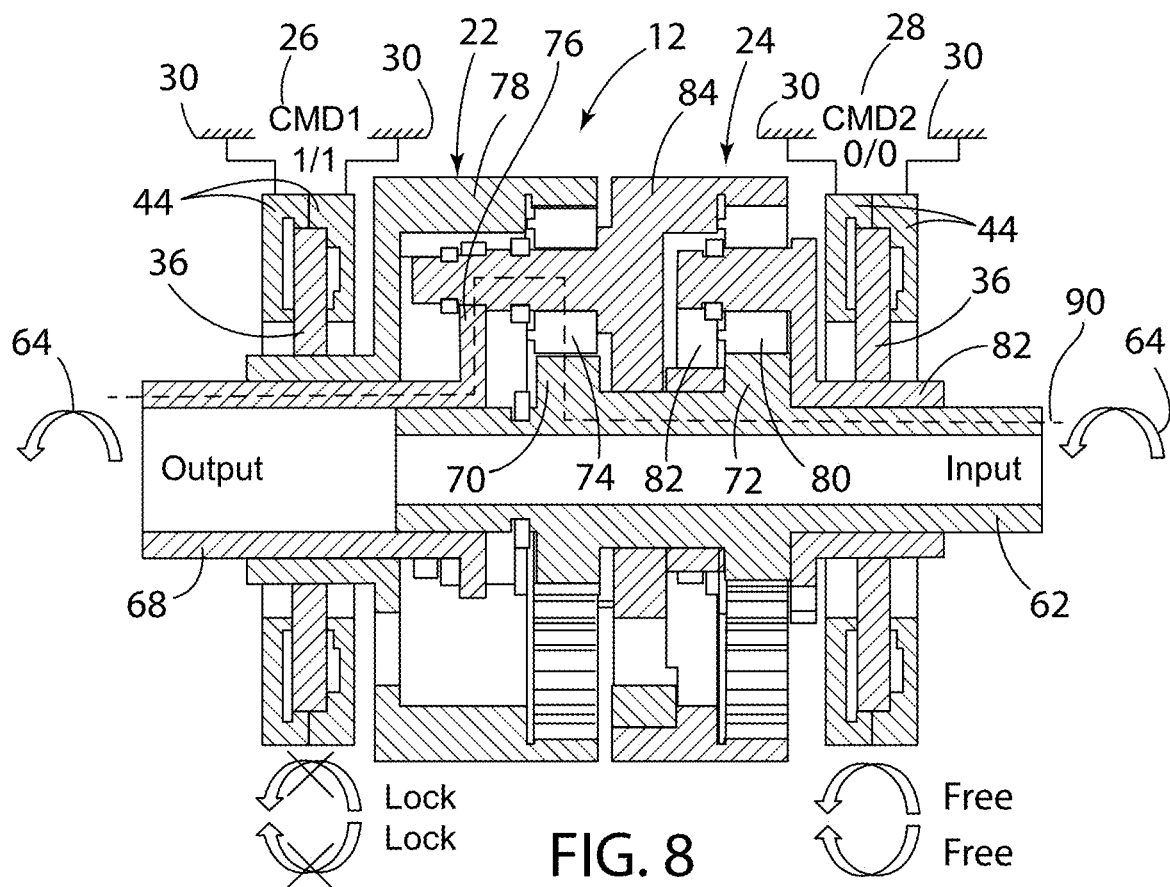
FIG. 8 is a schematic cross-sectional illustration of a 2-speed transmission operating in a 1st forward gear with power on and regeneration allowed.

FIG. 8 illustrates the transmission placed in a $1^{st}$ forward gear with power on and regeneration allowed. The transmission achieves this condition by placing the first CMD 26, adjacent to the output shaft 68, in a 1/1 mode or lock-lock position to lock and prevent movement of the first ring or annulus (A1) 78. Rotating the electric motor 10 in a counterclockwise direction rotates the input shaft 62 in the counterclockwise direction, arrow 64. Wherein rotation of the sun gear (S1) 70, acting through the respective first planet gears 74, rotates the first planet carrier (PC1) 76 and the corresponding output shaft 68 in the counterclockwise direction.

Rotation of the first planet carrier (PC1) 76 correspondingly rotates the second ring or annulus (A2) 84. The second planet carrier (PC2) 82 is free to rotate because the second CMD 28 is placed in a 0/0 mode or free-free position (unlock-unlock). Allowing rotation of the second planet carrier (PC2) 82 compensates for the difference in rotation between the second ring or annulus (A2) 84 and the second sun (S2) 72.

The dotted line 90 shows the power flow/path from the input shaft 62 to the output shaft 68. Because the first CMD 26 is in a 1/1 mode or lock-lock position, during a regeneration phase, the vehicle wheels rotate the output shaft and, through the same power flow/path, dotted line 90, drive the input shaft wherein the electric motor 10 operates as a generator. For example, the first CMD 26 locks both ways, from the electric motor 10 to the wheels 14 and the wheels 14 to the electric motor 10.

Figure 8A:
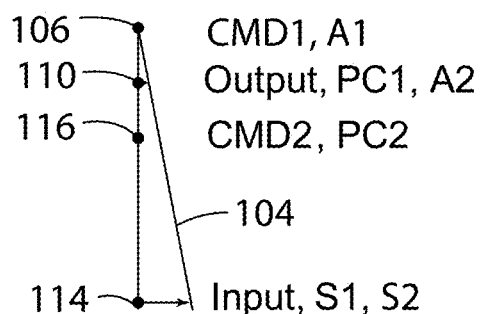
FIG. 8A is a lever diagram of the gearset of the transmission shown in FIG. 8.

The lever diagram of FIG. 8A shows transmission 12 output at the output node 110 when the vehicle is in a 1st forward gear with power on and regeneration allowed. The lever diagram shows the input moving the lever to the right, based on the input of the first sun (S1) with the lever pivoting about the first CMD 26/first ring or annulus (A1) and the output generated at the first planet carrier (PC1) 76. In the $1^{st}$ forward gear, the first CMD 26 holds/fixes the first ring or annulus (A1) 78 stationary while the input shaft 62 rotates the first sun (S1) 70 in a counterclockwise direction wherein the output is at the output node 110.

Figure 9:
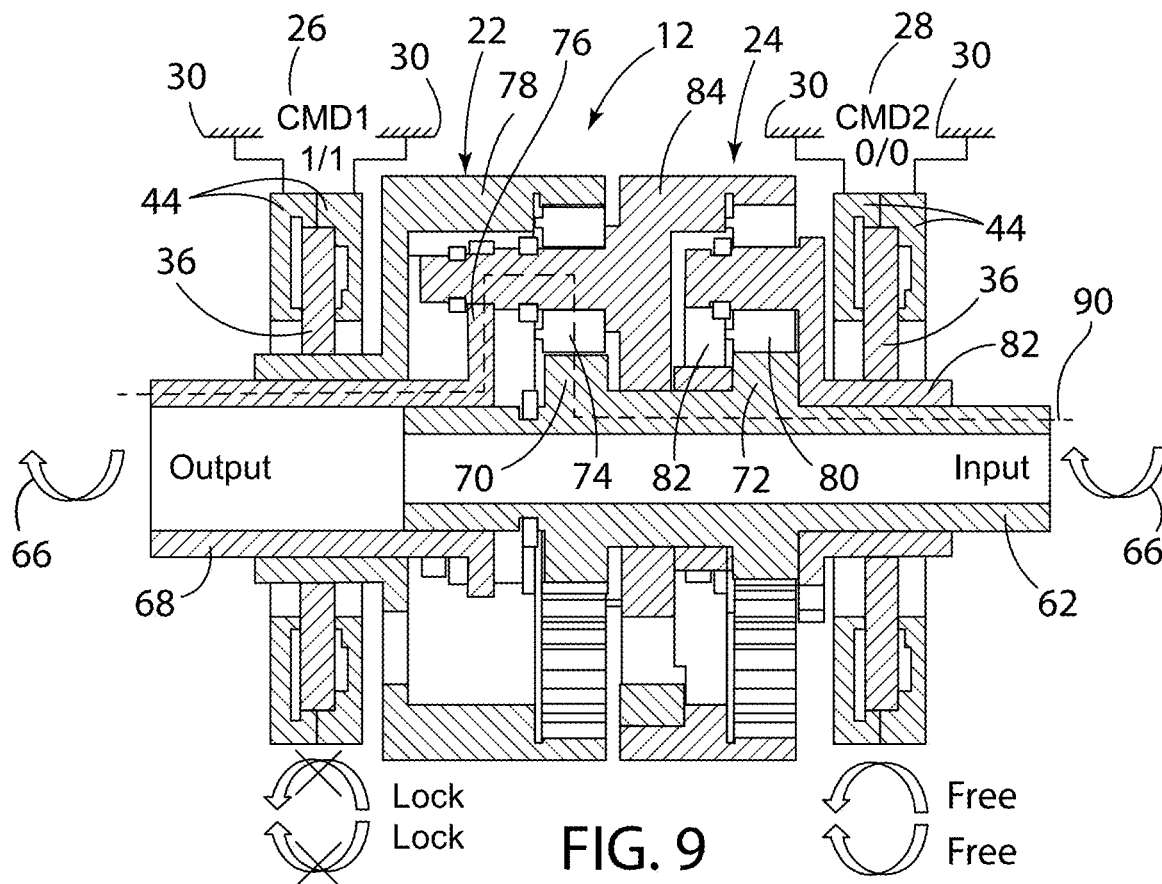
FIG. 9 is a schematic cross-sectional illustration of a 2-speed transmission in a 1st reverse gear with power on and regeneration allowed.

FIG. 9 illustrates the transmission placed in $1^{st}$ reverse gear with power on and regeneration allowed. The transmission achieves this condition by placing the first CMD 26, shown adjacent to the output shaft 68, in a 1/1 mode or lock-lock position to lock and prevent movement of the first ring or annulus (A1) 78. Accordingly, when the input shaft rotates the clockwise direction, arrow 66, rotation of the first sun gear (S1) 70, acting through the respective first planet gears 74, rotates the first planet carrier (PC1) 76 and output shaft 68 in a clockwise direction, arrow 66, and the vehicle moves in reverse, opposite to the forward motion of FIG. 8.

Figure 9A:
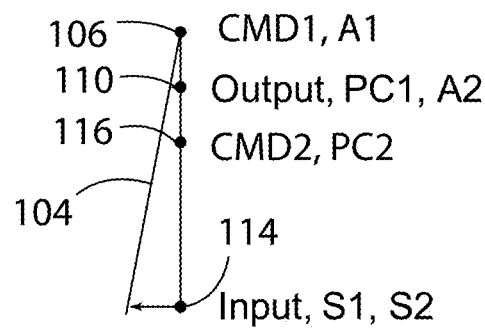
FIG. 9A is a lever diagram of the gearset of the transmission shown in FIG. 9.

The lever diagram of FIG. 9A shows transmission 12 output at the output node 110 when the vehicle is in $1^{st}$ reverse gear with power on and regeneration allowed. The lever diagram shows the input moving the lever to the left, based on the input of the first sun (S1) with the lever pivoting about the first CMD 26/first ring or annulus (A1) and the output generated at the first planet carrier (PC1) 76. In the $1^{st}$ reverse gear, the first CMD 26 holds/fixes the first ring or annulus (A1) 78 stationary while the input shaft 62 rotates the first sun (S1) 70 in a clockwise direction wherein the output is at the output node 110.

FIG. 8 shows the transmission 12 in the $1^{st}$ forward gear, with the input shaft 62 rotated in the counterclockwise direction, arrow 64. The first CMD 26 is in a 1/1 mode or locked-locked position. This mode holds the first ring or annulus (A1) stationary. The first sun (S1) 70 rotates in the counterclockwise direction, arrow 64. In this configuration, the first planet carrier (PC1) rotates in the counterclockwise direction, arrow 64, and rotates the output shaft 68. The second CMD 28 is in a 0/0 mode, free-free or unlocked-unlocked position.

The 1st gear (FIG. 8) and the 2nd gear (FIG. 12) of the transmission 12 can be forward gears; they move the vehicle forward when engaged. The transmission 12 is a 2-speed transmission that shifts between the $1^{st}$ and $2^{nd}$ gears when both operate as forward gears. For example, when operating in $1^{st}$ gear in a forward direction, the transmission 12 may shift to $2^{nd}$ gear, which continues the motion of and propels the vehicle forward. Accordingly, the transmission 12 is 2-speed transmission shiftable between a $1^{st}$ forward gear and a $2^{nd}$ forward gear.

Figure 12:
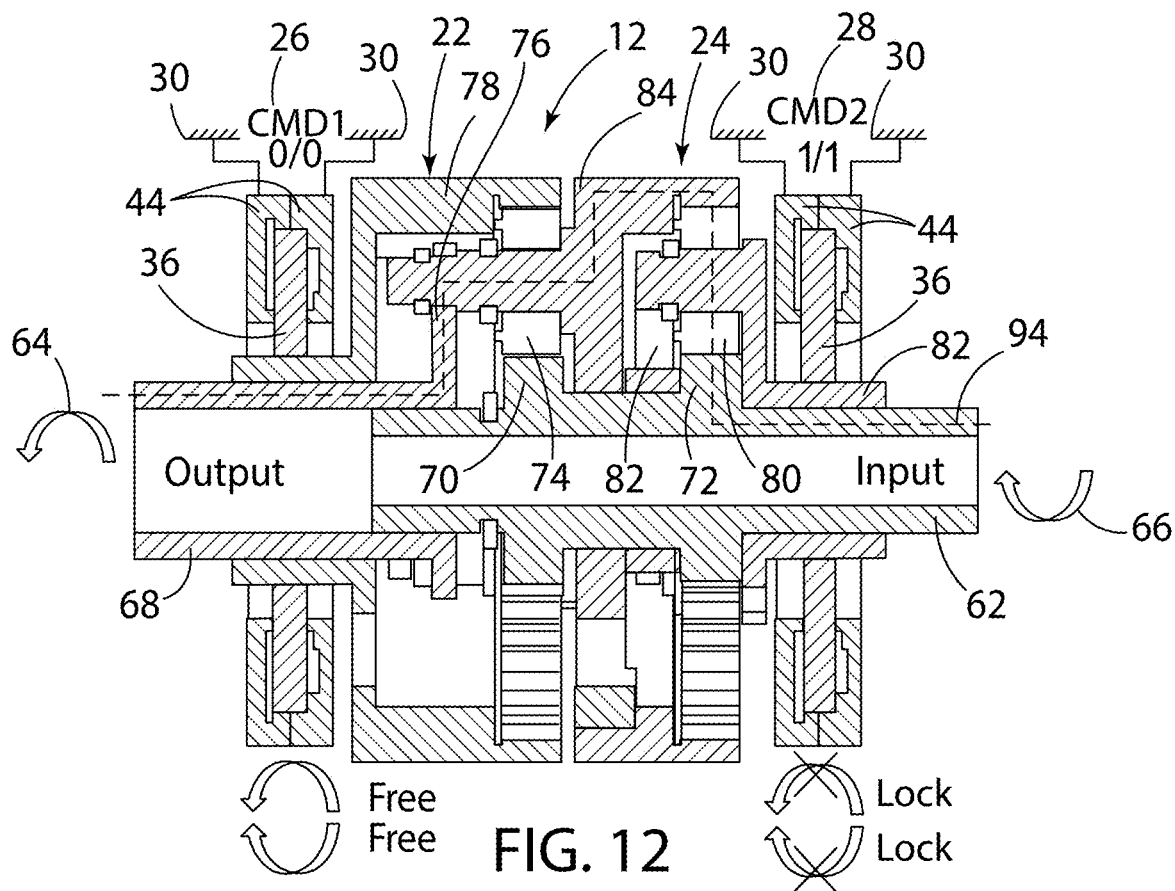
FIG. 12 is a schematic cross-sectional illustration of a 2-speed transmission shifted from the $1^{st}$ forward gear to the $2^{nd}$ forward gear and operating in the $2^{nd}$ forward gear with power on and regeneration allowed.

FIG. 12 shows the transmission 12 operating in the $2^{nd}$ forward gear. The power flow/path from the input shaft 62 to the output shaft 68, follows the dotted line 94. In addition to the different power flow/path from the input shaft 62 to the output shaft 68, when operating in the $2^{nd}$ forward gear, the electric motor 10 rotates in a clockwise direction and correspondingly rotates the input shaft 62 in the clockwise direction, arrow 66. This is opposite to the counterclockwise rotation of the electric motor 10 when operating in the $1^{st}$ forward gear. While the electric motor 10 rotation is disclosed as counterclockwise for the $1^{st}$ forward gear and clockwise for the $2^{nd}$ forward gear, this is one example. The respective rotation directions can be switched. The disclosure should not be limited but includes operating one forward gear with or in one motor direction and operating the second, or other forward gear, with or in the other or opposite motor direction.

As set forth more fully herein, shifting the gears between 1$^{st}$ gear to 2$^{nd}$ gear or 2$^{nd}$ gear to 1$^{st}$ gear occurs when the electric motor 10 changes direction. As disclosed, the transmission 12 operates in the 1$^{st}$ forward gear when the electric motor 10 rotates in a counterclockwise direction, arrow 64 and in the 2$^{nd}$ forward gear when the electric motor 10 rotates in a clockwise direction, arrow 66. The 2-speed transmission shifts between the 1$^{st}$ forward gear and the 2$^{nd}$ forward gear when the motor rotation direction changes—from clockwise to counterclockwise or clockwise to counterclockwise.

FIG. 12 shows the transmission 12 shifted from the 1$^{st}$ forward gear to the 2$^{nd}$ forward gear and operating in the 2$^{nd}$ forward gear with the electric motor 10 rotating clockwise. As shown, the input shaft 62 rotates in the clockwise direction, arrow 66. The second CMD 28 is in a 1/1 mode or locked-locked. This mode holds the second planet carrier (PC2) stationary. The second sun (S2) 72 rotates with the input shaft 62 in the clockwise direction, arrow 66. When the second CMD 28 is in a 1/1 mode or locked-locked, the second ring or annulus (A2) 84 rotates in a counterclockwise direction, opposite the rotation direction of the second sun (S2) 72. The second ring or annulus (A2) 84 and the first planet carrier (PC1) 76 are fixed/rotate together and provide the output to the output shaft 68. Because the first ring or annulus (A1) 78 is unlocked or free, allowed to move, it rotates due to the input of the first sun (S1) 70 and planet gears 74 of the first planet carrier (PC1) 76. The combined rotation of the first ring or annulus (A1) 78 with the second ring or annulus (A2) 84 and the first planet carrier (PC1) 76 results in an increased output at the output shaft 68.

Figure 12A:
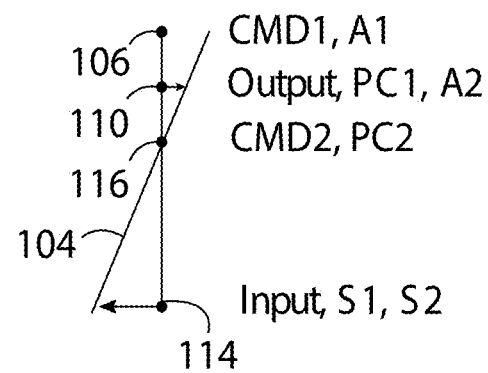
FIG. 12A is a lever diagram of the gearset of the transmission shown in FIG. 12.

The lever diagram of FIG. 12A shows transmission 12 output at the output node 110 when the vehicle is in a 2nd forward gear with power on and regeneration allowed. The lever diagram shows the input moving the lever, line 104 to the left, based on the clockwise input of the second sun (S2) 72 with the lever pivoting about the second CMD 26/second planet carrier (PC2) 82 and the output generated at the first planet carrier (PC1) 76 and second ring or annulus (A2) 84. In the 2$^{nd}$ forward gear, the second CMD 28 holds/fixes the second planet carrier (PC2) 82 stationary while the input shaft 62 rotates the second sun (S2) 72 in a clockwise direction wherein the output is at the output node 110.

As shown in FIG. 8, the transmission 12 operates in the 1$^{st}$ forward gear along the power flow/path, dotted line 90, when rotating the electric motor 10 counterclockwise. FIG. 12 shows that the transmission 12 operates in the 2$^{nd}$ forward gear along the power flow/path, dotted line 94, when rotating the electric motor 10 clockwise. In 2$^{nd}$ gear, the vehicle can be driven in reverse, a rearward direction of vehicle travel, by changing the rotation direction of the electric motor 10 to counterclockwise. With the first and second CMDs 26, 28 placed in the modes shown in FIG. 12, changing the rotation direction of the motor will change the vehicle direction, either forward or backward. When the transmission 12 is in the 2$^{nd}$ forward or reverse gear, the second CMD 28 is placed in a 1/1 mode lock-lock condition, and the first CMD 26 is in a 0/0 mode, free-free unlock-unlock condition.

Figure 10:
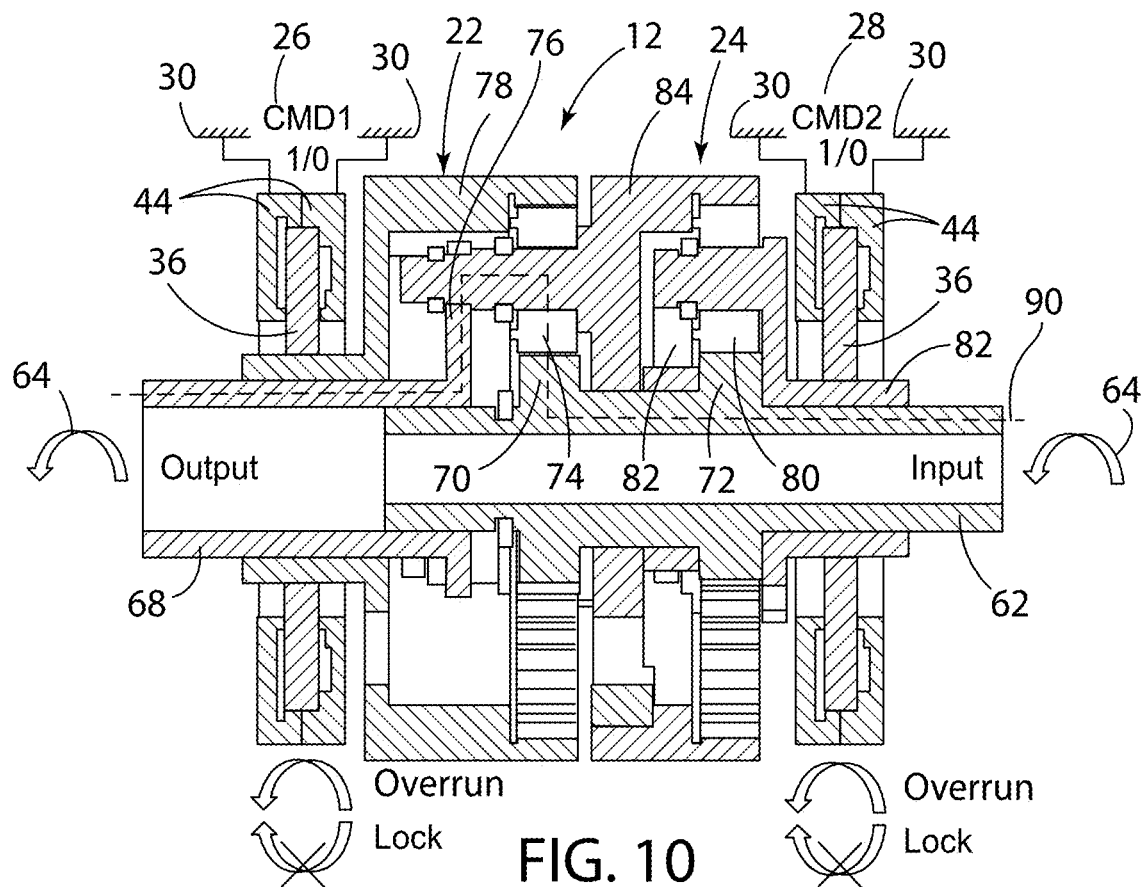
FIG. 10 is a schematic cross-sectional illustration of a 2-speed transmission shifting from the $1^{st}$ forward gear to the $2^{nd}$ forward gear.
Figure 10A:
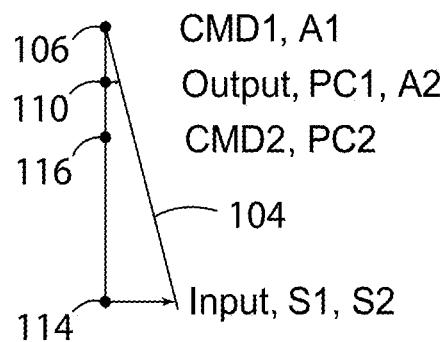
FIG. 10A is a lever diagram of the gearset of the transmission shown in FIG. 10.
Figure 11:
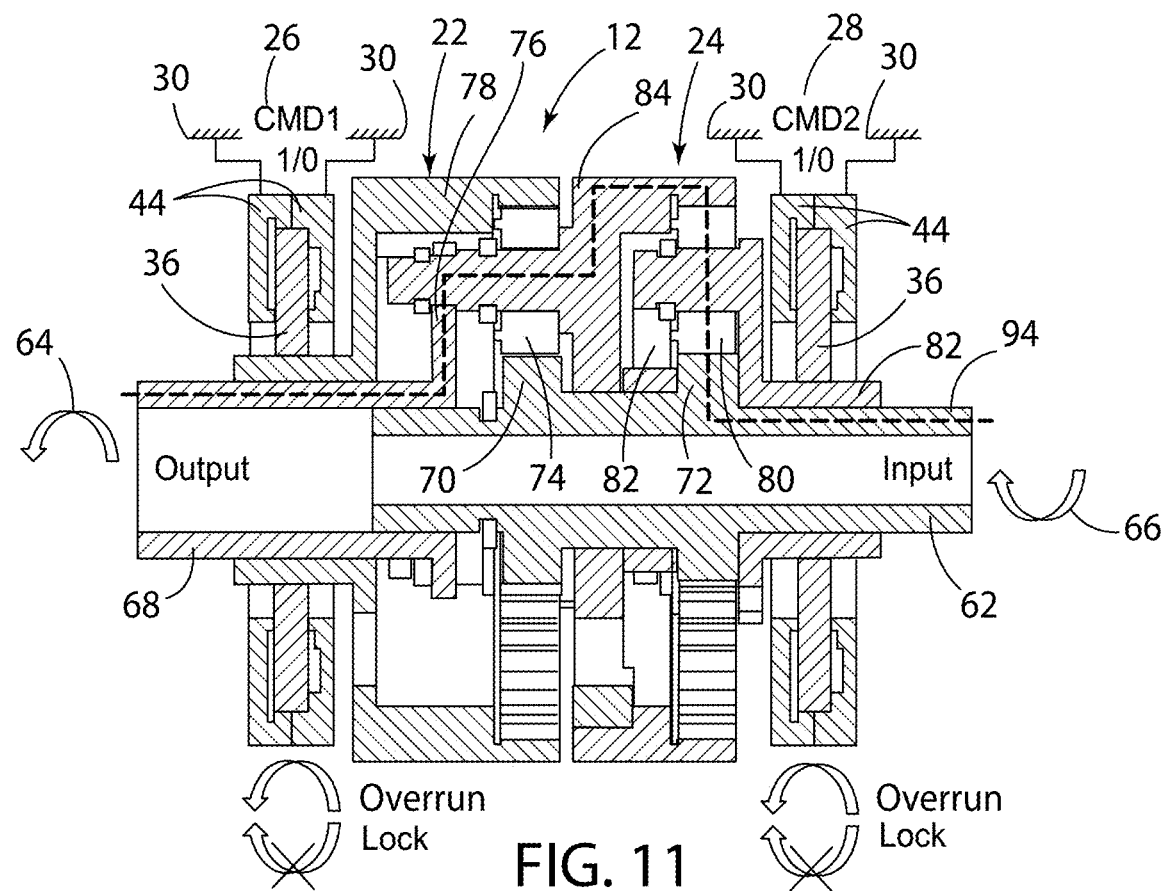
FIG. 11 is a schematic cross-sectional illustration of a 2-speed transmission and the first and second CMDs 26, 28 during shifting from the $1^{st}$ forward gear to the $2^{nd}$ forward gear
Figure 11A:
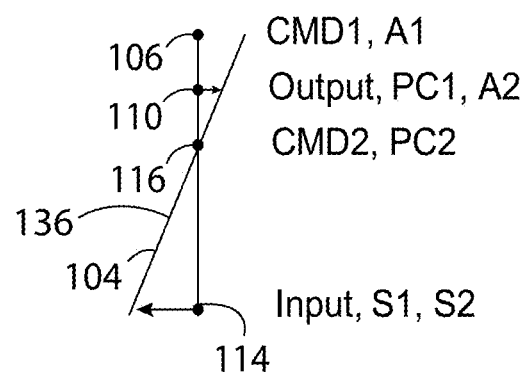
FIG. 11A is a lever diagram of the gearset of the transmission shown in FIG. 11.

FIGS. 10-11 illustrate an example of the shifting process; how the 2-speed transmission shifts from the 1$^{st}$ forward first gear to the 2$^{nd}$ forward gear or from the 2$^{nd}$ forward gear to the 1$^{st}$ forward gear based on the rotational direction of the electric motor 10. As shown in the exemplary embodiment, shifting either from the 1$^{st}$ forward gear to the 2$^{nd}$ forward gear or the 2$^{nd}$ forward gear to the 1$^{st}$ forward gear is completed with 1 step—changing the motor direction from counterclockwise to clockwise while landing on a one-way clutch in a power on vehicle forward direction. This can be completed with a layshaft or planetary transmission and with either static or dynamic selectable clutches.

FIGS. 10 and 11 illustrate the modes for the first and second CMDs 26, 28 during shifting from the 1$^{st}$ forward gear to the 2$^{nd}$ forward gear by changing the rotational direction of the electric motor 10, either from counterclockwise to clockwise or from clockwise to counterclockwise. When shifting, the power flow/path through the transmission 12 changes from the 1$^{st}$ forward gear power flow/path, dotted line 90, shown in FIG. 8, to the 2$^{nd}$ gear power flow/path, dotted line 94, shown in FIG. 12. When the motor changes directions for the shift, the shift comes off a one-way clutch and lands on a different one-way clutch in the direction of power on. In a powershift design, the vehicle has forward torque during the upshift (no torque interruption). In a non-powershift design, the motor typically needs to slow down to synchronize to the output speed when upshifting, engage a clutch, and then resume power-on torque to accelerate the vehicle.

FIG. 10 shows the transmission 12 providing an output in the 1$^{st}$ forward gear, along the power flow/path shown by dotted line 90, with the electric motor 10 still applying rotational input in the counterclockwise direction, arrow 64. In the 1$^{st}$ forward gear, the first CMD 26 is in a 1/1 mode or lock-lock position. One direction holds torque for forward, power-on vehicle direction, and the other direction holds torque for regeneration and reverse vehicle direction. Before a 1$^{st}$ to 2$^{nd}$ gear shift occurs, the first CMD 26, in a 1/1 mode, goes to a 1/0 mode (one-way clutch mode), and the second CMD 28 goes from a 0/0 mode (free-free position) to a 1/0 mode (one-way clutch mode). In this condition, the vehicle can still go forward, propelled by the electric motor 10.

Figure 13A:
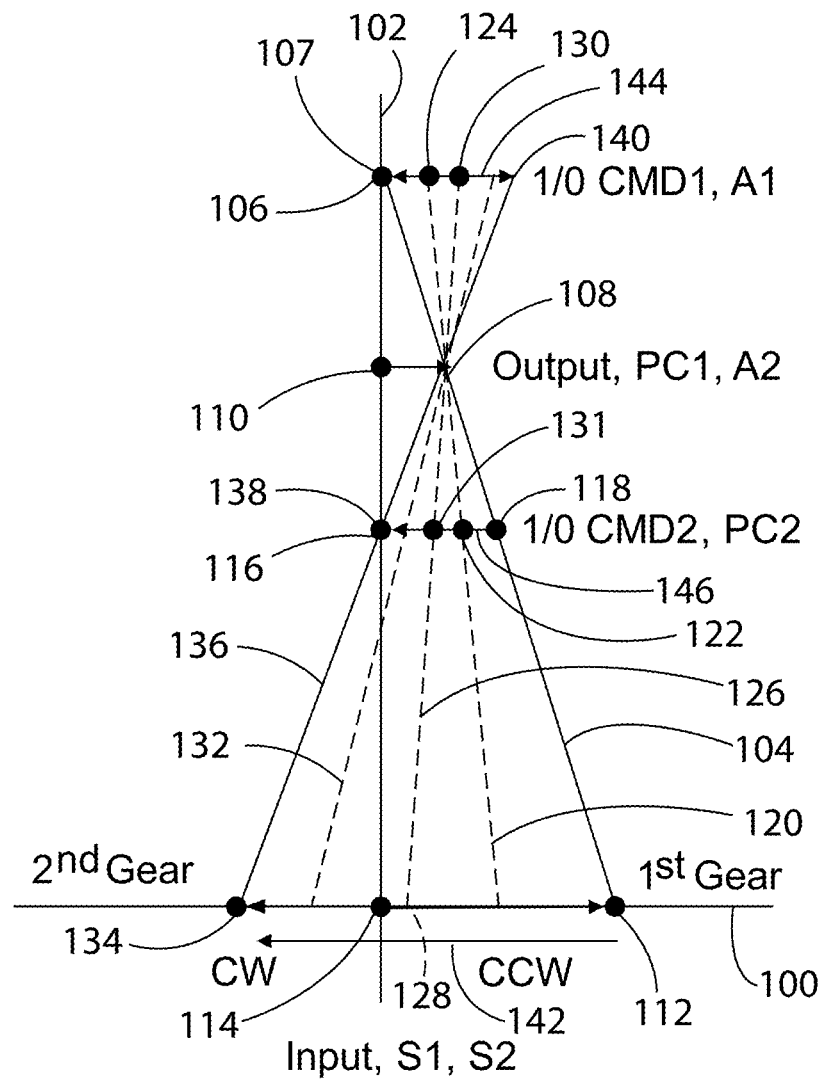
FIGS. 13A-13E are lever diagrams of the gearset of the transmission.

When the electric motor 10 transitions from a positive rpm (for example, a counterclockwise direction) to a negative rpm (for example, a clockwise direction), both one-way clutches go into an overrun mode, as shown in the lever diagram of FIG. 13A, wherein the lever pivots about the output (PC1, A2). As used herein, positive and negative relate to a change in the rotational direction or output of the electric motor 10. FIG. 13A shows counterclockwise rotational input as positive and rotational clockwise input as negative. An overrun mode relates to a strut set in an up position, with the plate rotating in the not lock direction, where rotation in the opposite direction is associated with a torque transfer. In an overrun mode or condition, when a driving member transfers torque to a driven member in one direction, the struts will become locked in the recesses of the driven coupling plate. If the driven coupling plate overruns the driving coupling plate, then torque transfer is interrupted, and the struts will pass over the recesses of the driven plate. In this way, a one-way clutch assembly is adapted for torque transfer in one direction while permitting overrun relative motion of the coupling plates in the opposite direction.

FIG. 10 illustrates the first CMD 26 placed in a 1/0 mode, preventing rotation of the first ring or annulus (A1) 78 in a clockwise direction, allowing torque transfer in the counterclockwise direction, arrow 64, at the output shaft 68, and permitting freewheeling relative motion of the annular plate 36 of the first CMD 26 and first ring or annulus (A1) 78 in the counterclockwise direction, arrow 64. As shown, the first ring or annulus (A1) 78 is placed in an overrun condition wherein the first ring or annulus (A1) 78 may rotate faster than the output shaft 68 in the counterclockwise direction. Placing the first CMD 26 in a 1/0 mode locks the rotation of the first ring or annulus (A1) in the clockwise direction while allowing rotation of the first ring or annulus (A1) in the counterclockwise direction, the same direction as the output shaft 68. FIG. 10 shows power on in first gear, wherein the first CMD 26 holds the first ring or annulus (A1) 78 stationary, against clockwise movement/rotation, enabling power transfer along the power flow/path, shown by the dotted line 90.

FIG. 10 illustrates the second CMD 28 placed in a 1/0 mode preventing rotation of the second planet carrier (PC2) 82 in a clockwise direction, allowing torque transfer in the counterclockwise direction, arrow 64 at the output shaft 68, and permitting freewheeling relative motion of the annular plate 36 of the second CMD 28 and the second planet carrier (PC2) 82 in the counterclockwise direction, arrow 64. As shown, the second planet carrier (PC2) 82 is placed in an overrun condition wherein the second planet carrier (PC2) 82 may rotate faster than the output shaft 68 in the counterclockwise direction, arrow 64. Placing the second CMD 28 in a 1/0 mode allows rotation of the second planet carrier (PC2) 82 in the counterclockwise direction, arrow 64, the same direction as the output shaft 68, while locking/preventing the rotation of the second planet carrier (PC2) 82 in the clockwise direction, arrow 66. In this condition, placing the second CMD in a 1/0 mode prepares the transmission 12 to shift from the 1$^{st}$ forward gear to the 2$^{nd}$ forward gear. In this condition, the vehicle may still be propelled forward by the electric motor 10.

FIGS. 10 and 11 illustrate respective overrun and lock conditions positions of the first and second CMDs 26, 28 when the electric motor 10 and correspondingly the input shaft 62 transitions from positive, counterclockwise rotation, arrow 64, FIG. 10, to negative, clockwise rotation, arrow 66, FIG. 11.

The lever diagram of FIG. 13A shows the first sun (S1) and second sun (S2) input, rotational direction, and speed along the X-axis 100. Counterclockwise rotation is on the positive/right side of the Y-axis or node axis 102, and clockwise rotation is on the negative/left side of the Y-axis or node axis.

The solid line 104 of FIG. 13A, also shown in FIG. 6A illustrates the gearset in 1$^{st}$ gear, setup for shifting to 2$^{nd}$ gear, with power on in 1$^{st}$ available, and the mode of the first and second CMDs 26, 28. The solid line 104 extends from the first CMD, the first ring or gear (A1)—first CMD node 106, through the output point 108 of the first planet carrier/second ring or annulus gear (PC1/A2)—output node 110 to input point 112 of the first sun gear (S1)—input node 114. The second CMD, the second planet carrier (PC2)—second CMD node 116 has a point 118 on line 104. Before beginning the shift represented by the lever arm, line 104, the counterclockwise rotation, rotational speed, at point 107, the intersection of line 104 and y-axis 102 is zero rpm. While the first CMD 26 is in an overrun mode, it is not actually overrunning—as represented by the term "Overrun" associated with the first CMD 26 in FIG. 10. The counterclockwise rotation, rotational speed, at point 118, associated with the second CMD 28, node 116, is greater than zero rpm resulting in an overrun condition, shown by the term "Overrun," associated with the second CMD 28, in FIG. 10.

The solid line 136 of FIG. 13A, also shown in FIG. 11, illustrates the gearset in 2$^{nd}$ gear, power on in 2$^{nd}$ gear available, shifted from 1$^{st}$ gear to 2$^{nd}$ gear, and the mode of the first and second CMDs 26, 28. The solid line 136 extends from the input point 134 of the second sun gear (S2)—input node 114 through the second CMD, the second planet carrier (PC2)—second CMD node 116 having a point 138 on line 136, the intersection of line 136 and y-axis 102. The solid line 136 extends through the output point 108 of the first planet carrier/second ring or annulus gear (PC1/A2)—output node 110 to point 140 of the first CMD, the first ring or gear (A1)—first CMD node 106. In the operating condition represented by the lever arm/line 136, just after the shift from 1$^{st}$ gear to 2$^{nd}$ gear, the counterclockwise rotation, rotational speed, at point 138 is zero rpm, while the second CMD 28 is in an overrun mode, it is not actually overrunning-represented by the term "Overrun" in FIG. 11 associated with the second CMD 28. The counterclockwise rotation, rotational speed, at output point 140 is greater than zero rpm resulting in an overrun condition, shown by the term "Overrun," associated with the first CMD 26 in FIG. 11.

Because the shift from 1st gear to 2nd gear or 2nd gear to 1st gear takes place in under a second and may occur in less than 500 ms, the output—rotational speed of the first planet carrier/second ring or annulus gear combination (PC1/A2) 76, 84 during the shift operation/procedure remains substantially constant. Typically, the shift operation/procedure takes very little time on the order of 250 ms, and the rotational speed at the output point 108 changes insignificantly. However, because the first and second CMDs 26, 28 are placed in an overrun condition, they can accommodate changes (reductions or increases) in rotational speed at the output point 108 during the shift operation/procedure.

Figure 13B:
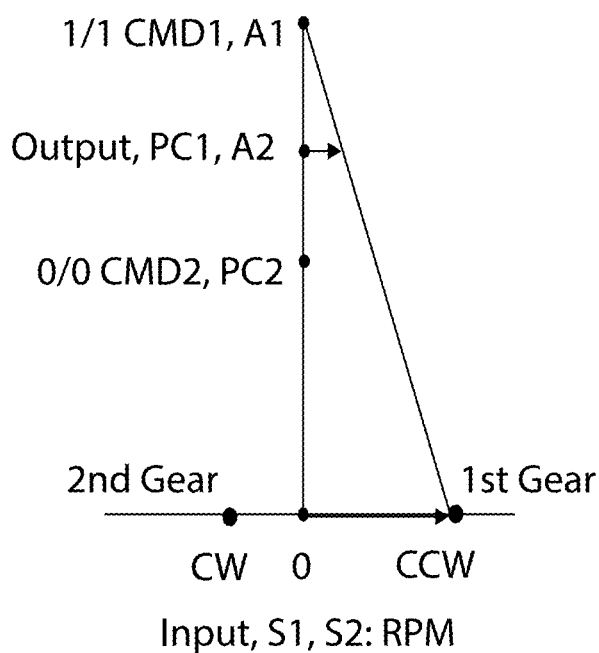
Figure 13C:
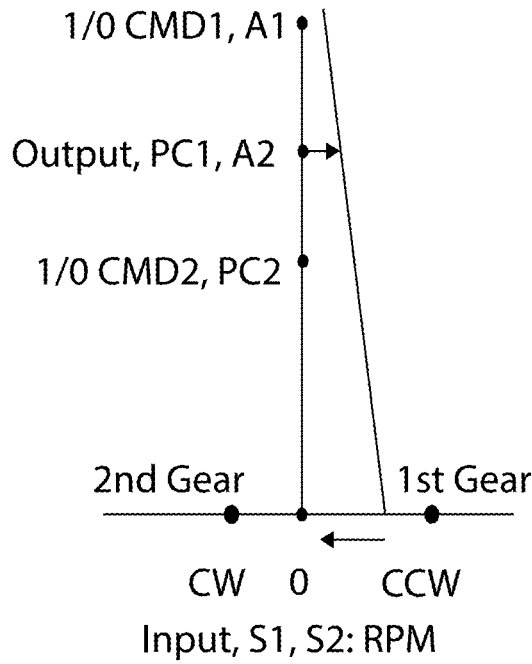
Figure 13D:
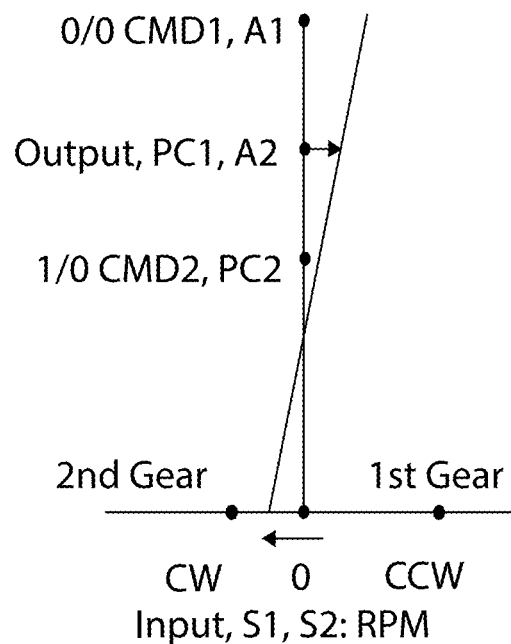

FIGS. 13A, 13C, and 13D show transitional lever diagrams/lines as the rotation speed and direction of the electric motor 10 change. Because the output point 108 remains relatively constant during the shift operation/procedure, the lever arm of FIG. 13A rotates about the output point 108. The lever arm transitions from the 1$^{st}$ gear condition, line 104, FIGS. 10, 13A to the 2$^{nd}$ gear condition, line 136, FIGS. 11, 13A as the rotational speed and direction of the electric motor 10 and the corresponding input shaft 62 changes. As the input shaft 62 rotational speed reduces in the counterclockwise direction, the input point 112 moves along the X-axis 100, and the lever arm pivots about the output point 108. When the lever arm reaches the first dashed line 120, the counterclockwise rotation, rotational speed, at the point 122 of the second CMD, the second planet carrier (PC2)—second CMD node 116, while less than that at the point 118, still exceeds 0 rpm, resulting in a continuing overrun condition at the second CMD 28. The lever arm shown by the first dashed line 120 shows the output at point 124 of the first CMD 26, first ring or gear (A1)—first CMD node 106, now exceeds zero rpm, resulting in an overrun condition at the first CMD 26.

When the motor input reaches the rotational input point 128, the lever arm pivots about the output point 108 to the position shown by the second dashed line 126. The rotational input point 128 is near the transition point from counterclockwise motor rotation to clockwise motor rotation—the intersection of the x-axis 100 and y-axis 102, input node 114, wherein the input changes from counterclockwise to clockwise and from the first sun (S1) to the second sun (S2). Lever arm/line 126 shows the counterclockwise rotation and rotational speed at point 131 of the second CMD, the second planet carrier (PC2)—second CMD node 116, still exceeds 0 rpm, and point 130 of the first CMD 26, the first ring or gear (A1)—first CMD node, also exceeds zero rpm, resulting in an overrun condition at the first CMD 26 and the second CMD 28.

The dashed line 132 of FIG. 13A shows further progression of the lever arm toward the 2$^{nd}$ gear input point 134 associated with a lever arm shown by solid line 136. As the input moves from the first sun (S1)—input point 112 to the second sun (S2)—input point 134, arrow 142, the lines 120, 126, and 132 pivot about the output point 108, showing the overrun speed of the first CMD 26, the first ring or gear (A1)—first CMD node 106, increasing from 0 rpm, arrow 144 and the overrun speed of the second CMD, the second planet carrier (PC2)—second CMD node 116 decreasing towards 0 rpm. As illustrated, during a shift between the $1^{st}$ and $2^{nd}$ gear, when the motor input moves between the first and second sun (S1, S2) input points 112, 134, both the first and second CMDs 26, 28 are in an overrun condition.

At input point 134, the second CMD 28 engages at the second CMD node 116, whereby increased clockwise rotation at the input shaft 62 generates an increased output at output point 108. The one-way clutch of the second CMD 28 will decrease in overrun speed starting at the higher rpm until it captures the lever arm represented by solid line 136, FIG. 13A and FIG. 13E-lever diagram, as the lever arm attempts to pass through the second CMD node 116. As the motor begins negative, clockwise, rpm, the overrunning clutch of the second CMD 28 captures the spinning second planet carrier (PC2) 82, preventing clockwise rotation by landing on a one-way clutch in the power on vehicle forward direction.

Once holding torque on the 1/0 one-way clutch—second CMD 28, the second CMD 28 opens a second selector plate changing the one-way clutch (1/0) into a lock-lock clutch (1/1). With the transmission 12 now in the $2^{nd}$ forward gear, the second CMD 28 holds torque in both directions, one direction for forward vehicle power-on direction and the other direction for regeneration or reverse vehicle direction. The struts of the first CMD 26 are placed in a 0/0 configuration or covered/free in both the clockwise or counterclockwise rotation.

The transmission 12 may achieve a park condition by placing both CMDs 26, 28 into 1/1 mode (lock-lock). The transmission 12 can be placed directly in the park condition, regardless of whether the transmission 12 is in the $1^{st}$ forward or the $2^{nd}$ forward gear. In addition, the transmission 12 can move directly from the park to either the $1^{st}$ forward or the $2^{nd}$ forward gear. The disclosed transmission 12 may also move directly to reverse from the $1^{st}$ forward or the $2^{nd}$ forward gear. With the disclosed 2-speed transmission it is unnecessary to shift from the 2nd forward gear to the 1st forward gear before placing the 2-speed transmission in either park or reverse. The first and second CMDs 26, 28 also provide a hill-hold function in either the $1^{st}$ forward gear or the $2^{nd}$ forward gear for both up-hill and down-hill hill-hold since each strut set is independently controlled. As shown in FIG. 3, neutral is achieved by putting each CMD 26, 28 into a 0/0 mode or free-free position.

Figure 13E:
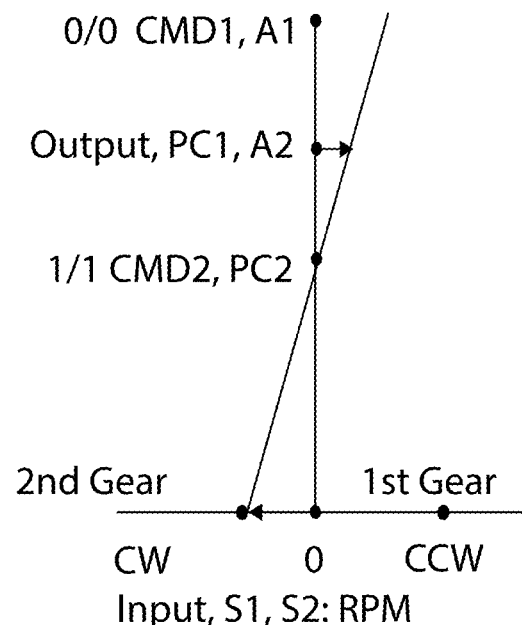

As disclosed, when the transmission is ready to shift, the electric motor quickly goes from a positive rpm to a negative rpm. FIGS. 6-12 illustrate the positive rpm associated with the counterclockwise direction and the negative rpm associated with the clockwise direction. As explained, these directions can be reversed or opposite. FIGS. 13A-13E illustrate lever diagrams of the transmission 12 as it progresses through the shift procedure, from the $1^{st}$ forward gear to the $2^{nd}$ forward gear. FIG. 13B is a lever diagram of the 2-speed transmission 13 in the $1^{st}$ forward gear. FIG. 13C illustrates a lever diagram of the 2-speed transmission shifting from the $1^{st}$ forward gear to the $2^{nd}$ forward gear, with the lever pivoting about the output node (PC1, A2), with the first CMD 26 in a 1/0 mode at node A1 and the second CMD 28 in a 1/0 mode at node PC2 as the rpm is reduced. FIG. 13D illustrates a lever diagram wherein the first CMD 26 goes to a 0/0 mode. The second CMD 28, node PC2, captures the lever just after it passes through zero (0) rpm. FIG. 13E illustrates a lever diagram wherein, now in the $2^{nd}$ forward gear, the second CMD 28 holds torque in both the forward vehicle power-on direction and the regeneration or reverse vehicle direction.

One example of the vehicle drive system 8 includes using an electric motor 10 having a motor rotor inertia: 0.03 kgm$^2$, a maximum e-motor speed: 10,000 rpm; a max vehicle speed: 100 mph, a ratio spread between $1^{st}$ and $2^{nd}$ gear: 2; and a shift speed between $1^{st}$ and $2^{nd}$ gear: 40 mph. The electric motor 10 is slowed from a 40 mph $1^{st}$ gear e-motor speed: 4,000 rpm CCW, with a target time to slow down from 4,000 rpm to 0 rpm of 132 ms. The electric motor 10 then changes rotation direction, from counterclockwise (CCW) to clockwise (CW), and speeds up to a 40 mph 2nd gear e-motor speed of 2,000 rpm CW. The target time to speed up to 2,000 rpm from 0 rpm of 33 ms resulting in a Total shift time of 165 ms.

Figure 14:
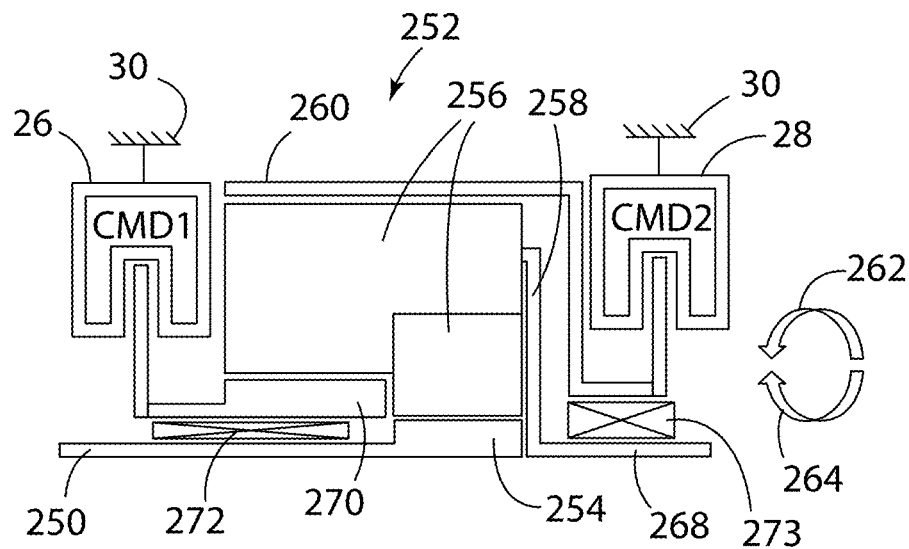
FIG. 14 is a schematic illustration of an additional embodiment of a planetary gearset according to an aspect of the present invention.

FIG. 14 illustrates an alternative example of the transmission 12 using a Ravigneaux gearset with associated CMDs to achieve a multi-speed transmission that shifts based on a change in motor rotation direction. As illustrated, the input shaft 250 provides the input to the Ravigneaux gearset, generally indicated at 252, through a second sun gear (S2) 254. The Ravigneaux gearset 252 includes a plurality of planetary gears, generally indicated at 256, a planet carrier (PC) 258, and a ring or annulus gear (A1) 260. When the electric motor 10 provides power to the input shaft 250, in either direction, as shown by the arrows 262, 264, the second sun gear (S2) 254 rotates in the same direction. The output shaft 268 connects to and rotates with the planet carrier (PC) 258. The planet carrier (PC) 258 is rotatably mounted about the output shaft 268 on a bearing 273. The first sun gear (S1) 270 is rotatably mounted about the input shaft 250 on a bearing 272. As illustrated in FIG. 14, the controllable mechanical diodes, CMDs 26, 28 located on each side of the Ravigneaux gearset 252 operate to selectively couple portions of the Ravigneaux gearset 252 to a transmission housing, generally indicated at 30.

Figure 14A:
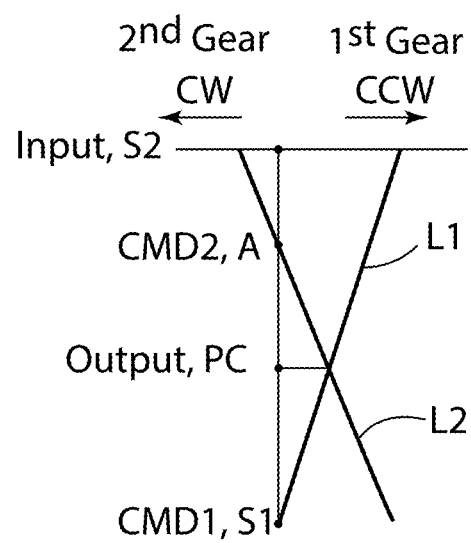
FIG. 14A is a lever diagram of the gearset of the transmission shown in FIG. 14.

FIG. 14A is a lever diagram illustrating a first lever L1 associated with the $1^{st}$ forward gear and a second lever L2 associated with the $2^{nd}$ forward gear, wherein the horizontal force and velocity relationship of the levers are identical to the torque and rotational velocity relationship of the gearset. Each lever has four nodes, the input at the second sun gear (S2) 254, the first CMD 26 associated with the first sun gear (S1), the second CMD 28 associated with the ring or annulus gear (A) 260, and the output at the planet carrier (PC) 258. Depending on the input (S2) and where the gearset is grounded, the first or second CMD 26, 28, the lever diagram represents the output at the planet carrier (PC) 258.

Figure 15C:
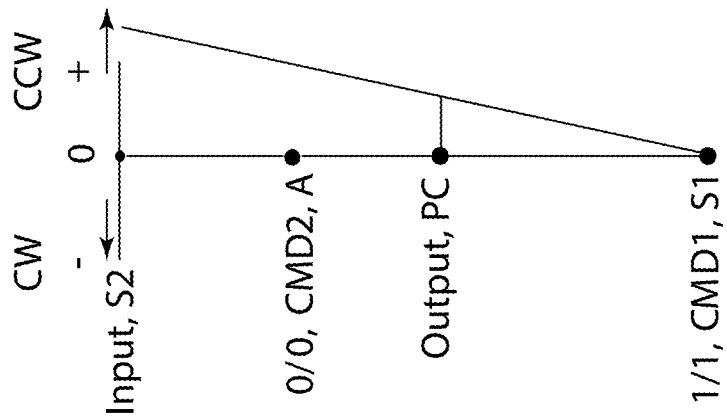
FIGS. 15A-F are lever diagrams of the gearset of the transmission shown in FIG. 14.
Figure 15B:
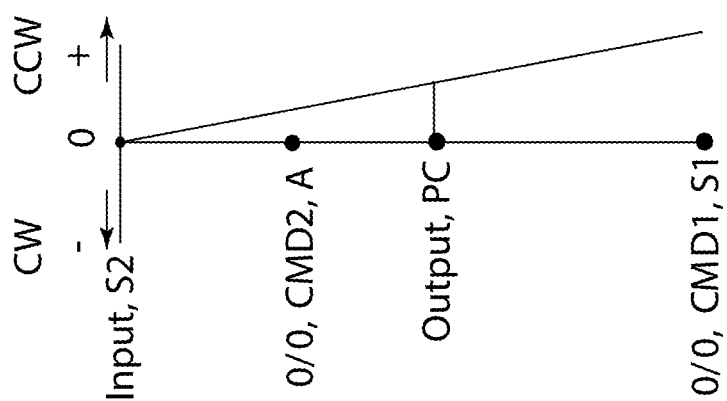
Figure 15A:
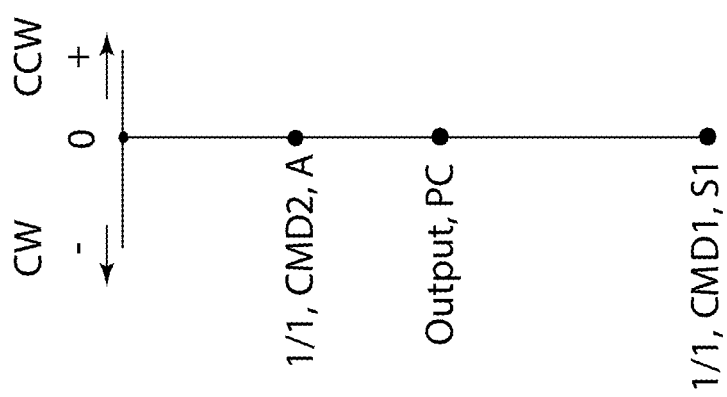

FIGS. 15A-15F are further lever diagrams illustrating the respective modes of each CMD 26, 28 at the various nodes. Lever diagram FIG. 15A shows the transmission output at the output node-planet carrier (PC) 258 when the vehicle is in the park condition. The transmission 12 achieves this condition/position by placing both CMDs 26, 28 in a 1/1 mode or lock-lock position. Locking the first sun gear (S1) 270 and the planet carrier (PC) 258 prevents rotation of the remaining components of the Ravigneaux gearset 252, thereby preventing any output or input to or from the wheels 14 of the vehicle.

The lever diagram of FIG. 15B shows the transmission output at the output node-planet carrier (PC) 258 when the transmission 12 is in the neutral condition. The transmission 12 achieves this condition/position by placing both CMDs 26, 28 in a 0/0 mode or free-free position (unlock-unlock).

Unlocking the ring or annulus (A) 260 and the planet carrier (PC) 258 provides free rotation of the remaining components of the Ravigneaux gearset 252, wherein no force, torque, or rotation is applied at the second sun (S2) 254 by or to the input shaft 250.

Lever diagram 15C shows transmission 12 output at the output node—planet carrier (PC) 258 when the vehicle is in a $1^{st}$ forward gear with power on and regeneration allowed. The lever diagram shows moving the lever to the right, based on the input of the second sun (S2), with the lever pivoting about the first CMD/first sun (S1) 270 and the output generated at the output node—planet carrier (PC) 258. In the $1^{st}$ forward gear, the first CMD 26 holds/fixes the first sun (S1) stationary while the input shaft 250 rotates the second sun (S2) 254 in a counterclockwise direction wherein the output is at the output node—planet carrier (PC) 258.

Lever diagram 15D shows transmission 12 output at the output shaft 268 when the vehicle is in $1^{st}$ reverse gear with power on and regeneration allowed. The lever diagram shows the input moving the lever to the left, based on the input of the second sun (S2) 254, with the lever pivoting about the first CMD 26/first sun (S1) 270 with the output generated at output node—the planet carrier (PC) 258. In the $1^{st}$ reverse gear, the first CMD 26 holds/fixes the first sun (S1) 270 stationary while the input shaft 250 rotates the second sun (S2) 254 in a clockwise direction with the output generated at the output node—the planet carrier (PC) 258.

Figure 15F:
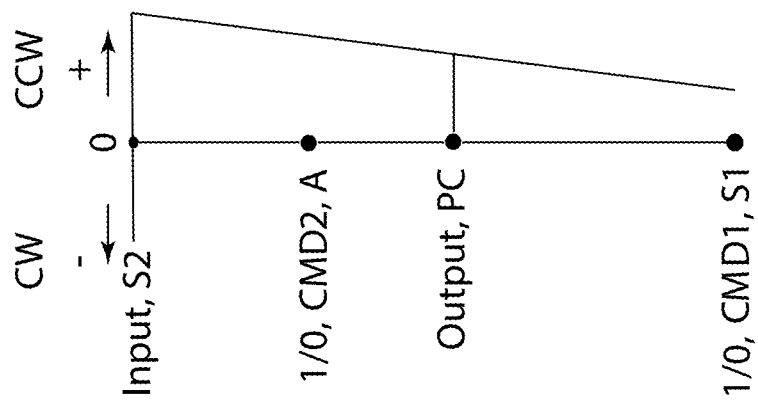
Figure 15E:
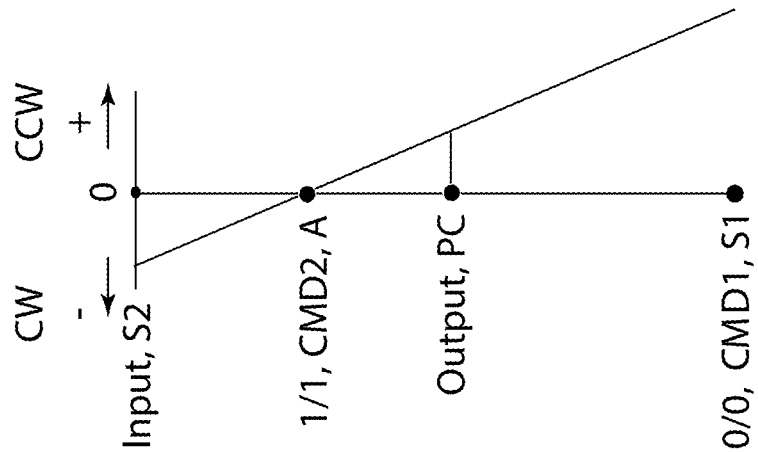
Figure 15D:
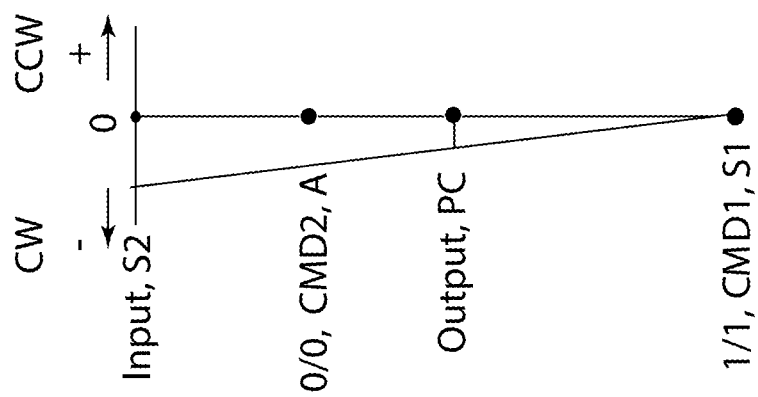

Lever diagram FIG. 15E shows transmission 12 output at the output node—the planet carrier (PC) 258 when the vehicle is in $2^{nd}$ forward gear with power on and regeneration allowed. The lever diagram shows the input moving the lever to the left, based on the clockwise input of the second sun (S2) 254 with the lever pivoting about the second CMD 28/ring or annulus (A) 260 and the output generated at the output node—the planet carrier (PC) 258. In the $2^{nd}$ forward gear, the second CMD 28 is in a 1/1 mode, or lock-lock position, and the first CMD 26 is in a 0/0 mode or free-free position (unlock-unlock) wherein the first sun (S1) 270 rotates freely in a counterclockwise direction with the output generated at the output node—the planet carrier (PC) 258.

Lever diagram FIG. 15F shows the 2-speed transmission shifting from the $1^{st}$ forward gear to the $2^{nd}$ forward gear, wherein the lever pivots about the output node—the planet carrier (PC) 258, with the second CMD 28 in a 1/0 mode at ring or annulus (A) 260 and the first CMD 26 in a 1/0 mode at the first sun (S1) 270. As the rpm is reduced, the input at the second sun (S1) moves to the left, from that shown in FIG. 15C, and reaches zero input, zero (0) rpm in the counterclockwise direction, wherein the first CMD 26 goes to a 0/0 mode and the second CMD 28, at the ring or annulus (A) 260, catching the lever after it passes through zero (0) rpm, see FIG. 15E. As shown in FIG. 15E with the transmission 12 in the $2^{nd}$ forward gear, the second CMD 28 in a 1/1 mode holds torque in both the forward vehicle power-on direction and the regeneration or reverse vehicle direction.

Figure 16:
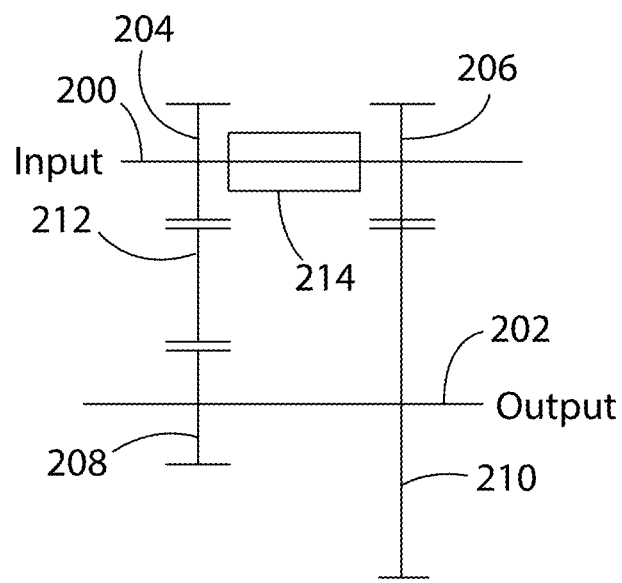
FIG. 16 is a schematic illustration of an alternative embodiment of a two-speed transmission according to the present invention.
Figure 17:
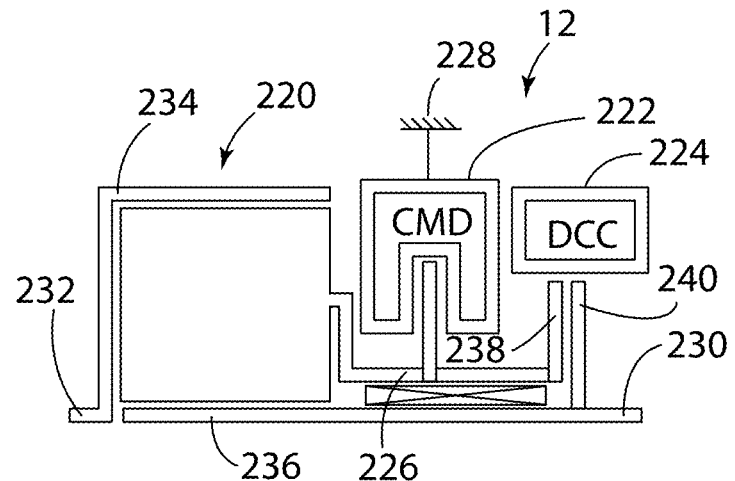
FIG. 17 is a schematic illustration of an additional alternative embodiment of a two-speed transmission according to the present invention.
Figure 18:
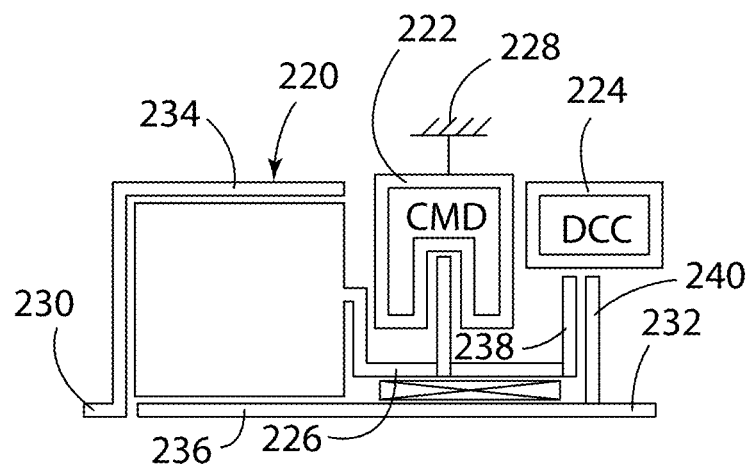
FIG. 18 is a schematic illustration of a further alternative embodiment of a two-speed transmission according to the present invention.

FIGS. 16-18 show alternative embodiments of the transmission 12 using different gear arrangements or configurations. Each embodiment shifts from a $1^{st}$ forward gear to a $2^{nd}$ forward gear based on a change in motor rotation.

FIG. 16 illustrates an alternative example of the transmission 12 using a layshaft configuration. The layshaft configuration includes a first or input shaft 200 and a second or output shaft 202. The first shaft 200, includes input gears 204, 206. The second or output shaft 202 includes output gears 208, 210. An intermediate gear 212 is positioned between input gear 204 and output gear 208. A dynamically controllable clutch (DCC), seen schematically at 214, one wherein both races of the clutch can rotate, operates to selectively couple one of the input gears 204, 206 to the first or input shaft 200 and correspondingly drive the second or output shaft 202. The dynamically controllable clutch 214 is a multi-mode clutch; in one example, a four-mode clutch.

Figure 16A:
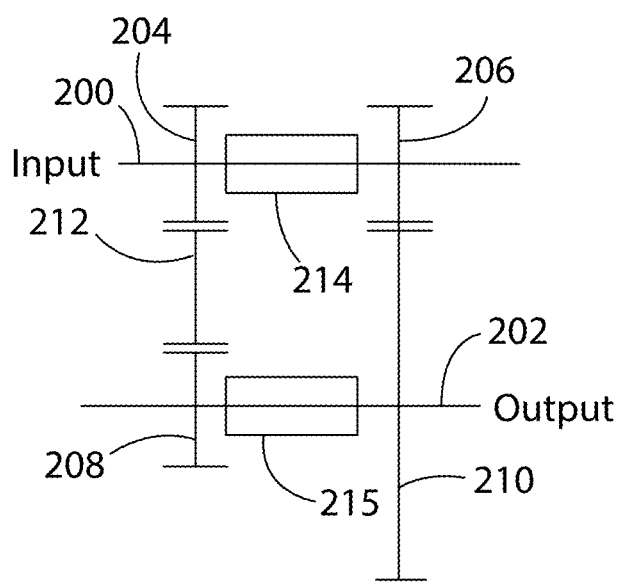
FIG. 16A is a schematic illustration of another alternative embodiment of a two-speed transmission according to the present invention.

FIG. 16A illustrates another example of the transmission 12 using a layshaft configuration, similar to that shown in FIG. 16. As shown, adding a second 4-mode dynamically controllable clutch (DCC) 215 between gears 208 and 210 enables selective coupling or uncoupling from output shaft 202. Adding the second 4-mode dynamically controllable clutch (DCC) 215 removes the unused power-flow direction from the geartrain for improved efficiency.

FIG. 17 shows another alternative example of the transmission 12 using a simple or single planetary gearset 220, a first clutch assembly 222, and a second clutch assembly 224. The first clutch assembly 222 is a controllable mechanical diode (CMD) that selectively couples a planet carrier (PC) 226 to a housing 228. The second clutch assembly 224 is a dynamically controllable clutch (DCC) having an inner race (DCC-IR) 238 and an outer race (DCC-OR) 240. The inner race (DCC-IR) 238 connects to the planet carrier (PC) 226, and the outer race (DCC-OR) 240 connects to the input shaft 230. The second clutch assembly 224, or dynamically controllable clutch (DCC), selectively couples the input shaft 230 to the planet carrier (PC) 226. The output shaft 232 is connected to the ring or annulus (A) 234.

Figure 17A:
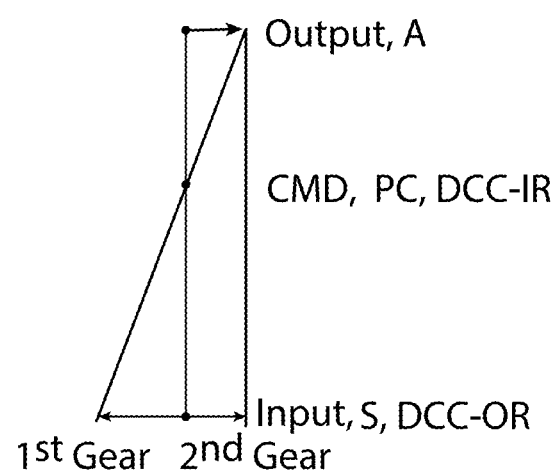
FIG. 17A is a lever diagram of the gearset of the transmission shown in FIG. 17.

The lever diagram of FIG. 17A shows transmission 12 output at the output node—the ring or annulus (A) 234 when the transmission 12 is in a $1^{st}$ forward gear and a $2^{nd}$ forward gear. The lever diagram shows the input moving the lever to the left in $1^{st}$ forward gear, based on the input of the input shaft 230 and corresponding sun gear(S) 236, with the lever pivoting about the first clutch assembly or CMD 222 with the output at the output node—the ring or annulus (A) 234. In the $1^{st}$ forward gear, the first clutch assembly or CMD 222 holds/fixes the planet carrier 226 stationary while the input shaft 230 rotates the sun(S) 236 in a clockwise direction wherein the output is at the output node—the ring or annulus (A) 234. The lever diagram shows the input moving the lever to the right in the $2^{nd}$ forward gear based on the input of the input shaft 230 and corresponding sun gear(S) 236. When in the $1^{st}$ forward gear, the output at the output shaft 232 varies, dependent upon the gear ratios, from the input at the input shaft 230. In the $2^{nd}$ forward gear, the second clutch assembly or DCC 224 holds/fixes the input shaft 230 and the planet carrier (PC) 226, wherein the input shaft 230 and planet carrier 226 rotate together. The ring or annulus (A) 234 rotates with the input shaft 230 and planet carrier 226. When in the $2^{nd}$ forward gear, the output at the output shaft 232 equals the input at the input shaft 230.

FIG. 18 shows a further alternative example of the transmission 12 using a simple or single planetary gearset 220, a first clutch assembly 222, and a second clutch assembly 224. The example of FIG. 18 differs from that of the example shown in FIG. 17 in that the input and outputs are reversed. The input shaft 230 is connected to the ring or annulus (A) 234, with the output shaft 232 connected to the sun(S) 236 of the simple or single planetary gearset 220. Like the previous embodiment, the first clutch assembly 222 is a controllable mechanical diode (CMD) that selectively couples a planet carrier (PC) 226 to a housing 228, and the second clutch assembly 224 is a dynamically controllable clutch (DCC) having an inner race (DCC-IR) 238 and an outer race (DCC-OR) 240. The inner race (DCC-IR) 238 connects to the planet carrier (PC) 226, and the outer race (DCC-OR) 240 connects to the output shaft 232. The second clutch assembly 224, or dynamically controllable clutch (DCC), selectively couples the output shaft 232 to the planet carrier (PC) 226.

Figure 18A:
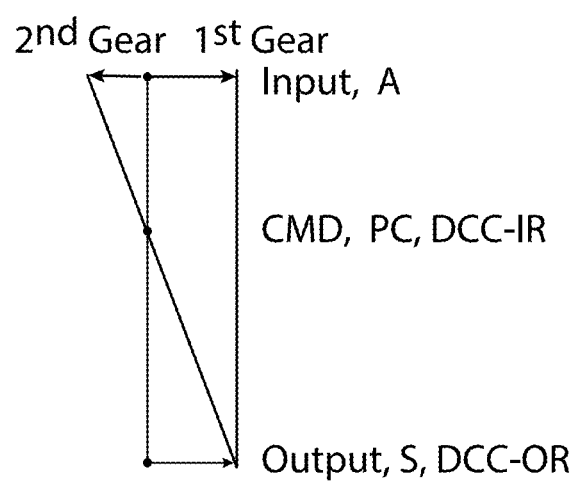
FIG. 18A is a lever diagram of the gearset of the transmission shown in FIG. 18.

The lever diagram of FIG. 18A shows transmission 12 output at the output shaft 232 when the transmission 12 is in a $1^{st}$ forward gear and a $2^{nd}$ forward gear. The lever diagram shows the input, rotating counterclockwise, moving the lever to the right in the $1^{st}$ forward gear based on the input of the input shaft 230 and corresponding ring or annulus (A) 234. In the $1^{st}$ forward gear, the second clutch assembly or DCC 224 holds/fixes the output shaft 232 and the planet carrier 226, wherein the output shaft 232 and planet carrier 226 rotate together. The ring or annulus (A) 234 rotates with the input shaft 230 and planet carrier 226. As shown, in the $1^{st}$ forward gear the output at the output node, the output at the output shaft 232, equals the input at the input shaft 230/ring or annulus (A) 234. The lever diagram shows the input moving the lever to the right in $1^{st}$ forward gear based on the input of the input shaft 230 and corresponding ring or annulus (A) 234. In the $2^{nd}$ forward gear, based on the input of the input shaft 230 and corresponding ring or annulus (A) 234, the lever pivoting about the CMD 222 with the output at the output node—the sun gear(S) 236 and corresponding output shaft 232. In the $2^{nd}$ forward gear, the CMD 222 holds/fixes the planet gear carrier 226 stationary while the input shaft 230 rotates the ring or annulus (A) 234 in a clockwise direction wherein the output is at the sun(S). The lever diagram shows the input, rotating clockwise, moves the lever to the left in the $2^{nd}$ forward gear. The lever diagram shows that in the $2^{nd}$ forward gear the output at the output node—sun(S) 236 varies, dependent upon gear ratios, from the input at the input shaft 230.

The 2-speed transmission of the exemplary embodiment uses two controllable one-way clutches and no friction clutches to achieve a 2-speed transmission for an electric vehicle. Changing the rotational direction of the electric motor 10 enables, during the shift, the power transfer to come off a one-way clutch and land on a different one-way clutch in the direction of power on. This allows the transmission to be easily controlled, have low drag losses, and have small packaging.

The foregoing applies to 3, 4, and 5-speed transmissions. A 2-speed transmission uses a 4-node planetary gearset. When using this design for a 3, 4, or 5-speed transmission, a 3-speed would use a 5-node planetary, a 4-speed would use a 6-node planetary, and a 5-speed would use a 7-node planetary, etc. Another example of a 3-speed transmission adds a dynamically controllable clutch (DCC) to a 4-node planetary gearset.

A further example of a 4-node planetary gearset includes changing the input at the outer nodes and the output at the inner nodes. For example, using the lever diagram of FIG. 2A, instead of the input, input node 114, being the first and second sun gears (S1, S2) 70, 72, the input node 114 moves to the first ring or gear (A1) 78. Correspondingly, the first CMD node 106, the first CMD 26, moves to the first and second sun gears (S1, S2) 70, 72. The output node 110, moves from the first planet carrier/second ring or annulus gear (PC1, A2) 76, 84 to the second planet carrier (PC2) 82. Correspondingly, the second CMD node 116 moves to the first planet carrier/second ring or annulus gear (PC1, A2) 76, 84. The foregoing input and output configuration also works with a Ravigneaux gearset.

The exemplary 2-speed transmission can be used as a high/low transmission since park, hill-hold, and reverse can be achieved directly from either the $1^{st}$ or the $2^{nd}$ gear. The 2-speed transmission of the disclosed embodiments can have full function while staying in the $1^{st}$ or $2^{nd}$ gear. High torque density and similar design can achieve 3-speeds if desired.

The description of the invention is merely exemplary in nature. Thus, variations that do not depart from the gist of the invention are intended to be within the scope of the invention. Such variations are not to be regarded as a departure from the spirit and scope of the invention.

What is claimed is:

1. A vehicle drive system comprising:
   an electric motor operable in a first direction and a second direction;
   a first shaft;
   a second shaft;
   a first gearset connecting the first shaft to the second shaft, the first gearset includes an input gear associated with the first shaft and an output gear associated with the second shaft, with an intermediate gear positioned between the input gear and the output gear;
   a second gearset connecting the first shaft to the second shaft, the second gearset includes an input gear associated with the first shaft and an output gear associated with the second shaft; and
   a controllable clutch selectively coupling one of the input gear of the first gearset and the input gear of the second gearset to the first shaft wherein operating the electric motor in the first direction and selectively coupling the input gear of the first gearset to the first shaft operates the second shaft at a first forward speed and operating the electric motor in the second direction and selectively coupling the input gear of the second gearset to the first shaft operates the second shaft at a second forward speed.

2. The vehicle drive system of claim 1 wherein:
   the controllable clutch is a dynamically controllable clutch wherein the dynamically controllable clutch connects the first shaft with one of the input gear of the first gearset and the input gear of the second gearset wherein the first shaft and respective input gear rotate together.

3. The vehicle drive system of claim 1 wherein:
   the controllable clutch is a multi-mode clutch.

4. The vehicle drive system of claim 3 wherein:
   the multi-mode clutch is a four-mode clutch.

5. The vehicle drive system of claim 1 wherein:
   the controllable clutch includes a plurality of selectable clutches.

6. The vehicle drive system of claim 1 wherein:
   the controllable clutch includes a first multi-mode clutch connected to the first shaft and the input gear of the first gearset and a second multi-mode clutch connected to the second shaft and the input gear of the second gearset.

7. The vehicle drive system of claim 1 including:
   a second controllable clutch, the second controllable clutch selectively couples one of the output gear of the first gearset and the output gear of the second gearset to the second shaft.

8. A vehicle drive system comprising:
   a motor operable in a first direction and a second direction;
   a transmission having an input and an output, the input connected to the motor;
   a first gearset including an input gear associated with the input, an output gear associated with the output, and an intermediate gear positioned between the input gear and the output gear; and a second gearset including an input gear associated with the input and an output gear associated with the output;

a first controllable multi-mode clutch selectively coupling the input gear of the first gearset and the input; and the first controllable multi-mode clutch selectively coupling the input gear of the second gearset and the input wherein the transmission has a first forward speed and a second forward speed, the transmission operating in the first forward speed when the motor operates in the first direction of rotation and operates in the second forward speed when the motor operates in the second direction of rotation.

9. The vehicle drive system of claim 8 including:

a second controllable multi-mode clutch selectively coupling the output gear of the first gearset and the output; and the second controllable multi-mode clutch selectively coupling the output gear of the second gearset and the output.

10. The vehicle drive system of claim 9 wherein:
the first controllable multi-mode clutch has at least four modes.

11. The vehicle drive system of claim 9 wherein:
the second controllable multi-mode clutch has at least four modes.

12. The vehicle drive system of claim 9 wherein:
the direction of motor operation determines the selective coupling of the first controllable multi-mode clutch and the second controllable multi-mode clutch.

13. A transmission comprising:
an input shaft rotatable in a first direction and a second direction;
an output shaft;
a first gearset including an input gear associated with the input shaft, an output gear associated with the output shaft, and an intermediate gear positioned between and engaging the input gear and the output gear;
a second gearset includes an input gear associated with the input shaft and an output gear associated with the output shaft;
a first clutch selectively coupling the input gear of the first gearset to the input shaft;
the first clutch selectively coupling the input gear of the second gearset to the input shaft;
a second clutch selectively coupling the output gear of the first gearset to the output shaft; and
the second clutch selectively coupling the output gear of second gearset to the output shaft wherein the transmission operates in a first gear when the input shaft rotates in the first direction and operates in a second gear when the input shaft rotates in the second direction.

14. The transmission of claim 13 wherein:
the first clutch includes a dynamically controllable clutch positioned between the input gear of the first gearset and the input gear of the second gearset; and
the second clutch includes a dynamically controllable clutch positioned between the output gear of the first gearset and the output gear of the second gearset.

15. The transmission of claim 13 wherein:
the transmission has a first forward speed and a second forward speed, the transmission operating in the first forward speed and the second forward speed based on the rotation direction of the input shaft and the selective coupling of the first clutch and the second clutch.

16. The transmission of claim 13 wherein:
the first clutch includes a dynamically controllable clutch connecting the input shaft and one of the input gear of the first gearset and the input gear of the second gearset wherein the input shaft and respective input gear rotate together; and
the second clutch includes a dynamically controllable clutch connecting the output shaft and one of the output gear of the first gearset and the output gear of the second gearset wherein the output shaft and the respective output gear rotate together.

17. The transmission of claim 13 wherein:
the first clutch is a multi-mode clutch and the second clutch is a multi-mode clutch.

18. A transmission comprising:
an input shaft rotatable in a first direction and a second direction;
an output shaft;
a first gearset including an input gear associated with the input shaft, an output gear associated with the output shaft, and an intermediate gear positioned between and engaging the input gear and the output gear;
a second gearset includes an input gear associated with the input shaft and an output gear associated with the output shaft;
a first clutch selectively coupling one of the input gear of the first gearset and the input gear of the second gearset to the input shaft;
a second clutch selectively coupling one of the output gear of the first gearset and the output gear of second gearset to the output shaft wherein the transmission operates in a first gear when the input shaft rotates in the first direction and operates in a second gear when the input shaft rotates in the second direction;
the first clutch includes a first multi-mode clutch having four modes and a second multi-mode clutch having four modes; and
the second clutch includes a first multi-mode clutch having four modes and a second multi-mode clutch having four modes.

* * * * *